United States Patent
Kim et al.

(10) Patent No.: US 10,456,763 B2
(45) Date of Patent: Oct. 29, 2019

(54) CARBONATED WATER PRODUCING APPARATUS, REFRIGERATOR HAVING THE SAME, AND METHOD OF CONTROLLING THE SAME

(71) Applicant: Samsung Electronics Co., Ltd, Gyeonggi-do (KR)

(72) Inventors: Dae Sung Kim, Gwangju (KR); Sang Chul Ryu, Gwangju (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 15/343,167

(22) Filed: Nov. 3, 2016

(65) Prior Publication Data

US 2017/0120209 A1    May 4, 2017

(30) Foreign Application Priority Data

Nov. 3, 2015   (KR) .......................... 10-2015-0153848

(51) Int. Cl.
*B01F 15/00* (2006.01)
*B01F 3/04* (2006.01)
(Continued)

(52) U.S. Cl.
CPC .... *B01F 15/00922* (2013.01); *B01F 3/04794* (2013.01); *B01F 3/04808* (2013.01);
(Continued)

(58) Field of Classification Search
CPC .... G01L 11/04; G01L 11/06; B01F 15/00922; B01F 3/04815; B01F 3/04808;
(Continued)

(56) References Cited

U.S. PATENT DOCUMENTS

| | | | |
|---|---|---|---|
| 4,197,752 A * | 4/1980 | Block | G01L 21/00 |
| | | | 702/138 |
| 4,869,097 A * | 9/1989 | Tittmann | G01L 11/04 |
| | | | 73/52 |

(Continued)

FOREIGN PATENT DOCUMENTS

| | | |
|---|---|---|
| KR | 10-2006-0000202 | 1/2006 |
| KR | 10-2011-0076586 | 7/2011 |

(Continued)

*Primary Examiner* — Stephen Hobson

(57) ABSTRACT

Disclosed herein is a carbonated water producing apparatus which guides a replacement of a cylinder using sound generated when carbon dioxide is supplied from the cylinder, and a refrigerator having the same. In accordance with one aspect of the present disclosure, a carbonated water producing apparatus comprising: a carbonated water producing unit including a cylinder configured to store carbon dioxide and configured to supply the carbon dioxide to a container; a microphone configured to obtain sound generated in the carbonated water producing unit; a filter configured to pass a signal having a frequency of a predetermined cutoff frequency or more of signals obtained by the microphone; a user interface unit configured to display information related to carbonated water production; and a controller configured to obtain the sound generated in the carbonated water producing unit by driving the microphone when the carbonated water producing unit operates, and configured to display a message which requests that the cylinder which stores the carbon dioxide be replaced on the user interface unit when an intensity of a signal passing through the filter is less than a predetermined reference value.

11 Claims, 16 Drawing Sheets

(51) Int. Cl.
*G01H 3/00* (2006.01)
*G08B 21/18* (2006.01)
*G01H 3/14* (2006.01)
*F25D 17/06* (2006.01)
*G01L 11/04* (2006.01)
*G01L 11/06* (2006.01)

(52) U.S. Cl.
CPC .... *B01F 3/04815* (2013.01); *B01F 15/00129* (2013.01); *G01H 3/00* (2013.01); *G01H 3/14* (2013.01); *G08B 21/182* (2013.01); *B01F 2003/049* (2013.01); *B01F 2215/0022* (2013.01); *F25D 17/065* (2013.01); *G01L 11/04* (2013.01); *G01L 11/06* (2013.01)

(58) Field of Classification Search
CPC ............ B01F 15/00129; B01F 3/04794; B01F 2003/049; B01F 2215/0022; G01H 3/14; G01H 3/00; G08B 21/182; F25D 17/065
See application file for complete search history.

(56) References Cited

U.S. PATENT DOCUMENTS

| | | | | |
|---|---|---|---|---|
| 4,991,145 | A * | 2/1991 | Goldstein | G08B 13/1681 200/61.62 |
| 6,301,973 | B1 * | 10/2001 | Smith | G01F 1/8436 73/861.27 |
| 6,339,960 | B1 * | 1/2002 | Costley | G01F 22/02 73/52 |
| 7,383,733 | B2 * | 6/2008 | Mosely | B06B 3/00 73/602 |
| 7,716,991 | B2 * | 5/2010 | Ahn | G01L 11/06 73/703 |
| 8,828,615 | B2 * | 9/2014 | Tighe | H01M 8/04388 429/415 |
| 2014/0053651 | A1 * | 2/2014 | Besling | G01L 9/0016 73/702 |
| 2014/0242218 | A1 * | 8/2014 | Cho | F25D 23/126 426/67 |
| 2018/0321103 | A1 * | 11/2018 | Johansen | G01L 11/02 |

FOREIGN PATENT DOCUMENTS

| | | |
|---|---|---|
| KR | 10-2015-0021609 | 3/2015 |
| KR | 10-2015-0028151 | 3/2015 |

* cited by examiner

CARBONATED WATER PRODUCING APPARATUS, REFRIGERATOR HAVING THE SAME, AND METHOD OF CONTROLLING THE SAME

CROSS-REFERENCE TO RELATED APPLICATION(S) AND CLAIM OF PRIORITY

This application claims the benefit of Korean Patent Application No. 10-2015-0153848, filed on Nov. 3, 2015 in the Korean Intellectual Property Office, the disclosure of which is incorporated herein by reference.

TECHNICAL FIELD

Embodiments of the present disclosure relate to a carbonated water producing apparatus for producing and supplying carbonated water, a refrigerator having the same, and a method of controlling the same.

BACKGROUND

A refrigerator is an apparatus which keeps stored goods such as food, beverages, and the like in a fresh state for a long time, and includes a storage compartment, which may keep stored goods in a frozen or refrigerated state, and a machine compartment including a compressor, a condenser, an expansion valve, an evaporator, and the like which perform a refrigeration cycle of compression-condensation-expansion-evaporation.

The refrigerator maintains a temperature in the storage compartment at a freezing temperature or a refrigerating temperature using cold air which exchanges heat in the evaporation process of the refrigeration cycle.

Recently, with improvement in living standards, a capacity of a refrigerator is expanding in order to keep a large amount and a variety of stored goods, and functionality thereof is being diversified in order to improve a user's convenience.

In response to a user's demand, the refrigerator may include an ice-making device which generates ice, and a dispenser through which water or ice is withdrawn to the outside without opening a door.

SUMMARY

Therefore, it is an aspect of the present disclosure to provide a carbonated water producing apparatus which guides a replacement of a cylinder using sound generated when carbon dioxide is supplied from the cylinder, and a refrigerator having the same.

In accordance with one aspect of the present disclosure, a carbonated water producing apparatus comprising: a carbonated water producing unit including a cylinder configured to store carbon dioxide and configured to supply the carbon dioxide to a container; a microphone configured to obtain sound generated in the carbonated water producing unit; a filter configured to pass a signal having a frequency of a predetermined cutoff frequency or more of signals obtained by the microphone; a user interface unit configured to display information related to carbonated water production; and a controller configured to obtain the sound generated in the carbonated water producing unit by driving the microphone when the carbonated water producing unit operates, and configured to display a message which requests that the cylinder which stores the carbon dioxide be replaced on the user interface unit when an intensity of a signal passing through the filter is less than a predetermined reference value.

The controller displays the message which requests that the cylinder which stores the carbon dioxide be replaced on the user interface unit when the intensity of the signal passing through the filter is less than the predetermined reference value and the carbon dioxide is supplied from the carbonated water producing unit to the container.

The carbonated water producing unit includes an interrupter configured to interrupt a supply of the carbon dioxide and a hall sensor configured to detect an operating state of the interrupter; and the controller displays the message which requests that the cylinder which stores the carbon dioxide be replaced on the user interface unit when the intensity of the signal passing through the filter is less than the predetermined reference value and an operation of the interrupter is detected by the hall sensor.

The controller operates the microphone when a carbonated water production command is input through the user interface unit.

The carbonated water producing unit includes an interrupter configured to interrupt a supply of the carbon dioxide; and the controller operates the microphone when the interrupter operates.

The controller calculates a root mean square (RMS) value of the signal passing through the filter, and displays the message which requests that the cylinder which stores the carbon dioxide be replaced on the user interface unit when the calculated RMS value is less than the predetermined reference value.

The microphone includes a first microphone and a second microphone which are spaced a predetermined distance apart; and the apparatus further comprises a beamformer configured to remove a phase difference between sound signals obtained by the first microphone and the second microphone and then to sum the sound signals.

The filter passes a signal having a frequency of the predetermined cutoff frequency or more of the sound signals summed by the beamformer.

In accordance with one aspect of the present disclosure, a refrigerator comprising: a carbonated water producing unit including a cylinder configured to store carbon dioxide and configured to supply the carbon dioxide to a container; a dispenser provided in a door and including a discharge port configured to discharge carbon dioxide supplied from the carbonated water producing unit and having the container detachably provided therein; a microphone configured to obtain sound generated in the carbonated water producing unit; a filter configured to pass a signal having a frequency of a predetermined cutoff frequency or more of signals obtained by the microphone; a user interface unit configured to display information related to carbonated water production; and a controller configured to obtain the sound generated in the carbonated water producing unit by driving the microphone when the carbonated water producing unit operates, and configured to display a message which requests that the cylinder which stores the carbon dioxide be replaced on the user interface unit when an intensity of a signal passing through the filter is less than a predetermined reference value.

The controller displays the message which requests that the cylinder which stores the carbon dioxide be replaced on the user interface unit when the intensity of the signal passing through the filter is less than the predetermined reference value and the carbon dioxide is supplied from the carbonated water producing unit to the container.

The carbonated water producing unit includes an interrupter configured to interrupt a supply of the carbon dioxide; and the controller operates the microphone when the interrupter operates.

The microphone includes a first microphone and a second microphone which are spaced a predetermined distance apart; and the refrigerator further comprises a beamformer configured to remove a phase difference between sound signals obtained by the first microphone and the second microphone and then to sum the sound signals.

The filter passes a signal having a frequency of the predetermined cutoff frequency or more of the sound signals summed by the beamformer.

In accordance with one aspect of the present disclosure, a method of controlling a refrigerator, the method comprising: obtaining a sound generated in a carbonated water producing unit by driving a microphone when the carbonated water producing unit operates; separating, by a filter, a signal having a frequency of a predetermined cutoff frequency or more of obtained sound signals; displaying a message which requests that a cylinder which stores carbon dioxide be replaced on a user interface unit when an intensity of the separated signal is less than a predetermined reference value.

The displaying of the message which requests that the cylinder be replaced on the user interface unit includes displaying the message which requests that the cylinder which stores the carbon dioxide be replaced on the user interface unit when an intensity of a signal passing through the filter is less than the predetermined reference value and the carbon dioxide is supplied from the carbonated water producing unit to the container.

The displaying of the message which requests that the cylinder be replaced on the user interface unit includes displaying the message which requests that the cylinder which stores the carbon dioxide be replaced on the user interface unit when an intensity of a signal passing through the filter is less than the predetermined reference value and an operation of an interrupter is detected by a hall sensor.

The obtaining of the sound generated in the carbonated water producing unit by driving the microphone includes operating the microphone when an interrupter operates.

The displaying of the message which requests that the cylinder be replaced on the user interface unit includes: calculating an RMS value of a signal passing through the filter; and displaying the message which requests that the cylinder which stores the carbon dioxide be replaced on the user interface unit when the calculated RMS value is less than the predetermined reference value.

The microphone includes a first microphone and a second microphone which are spaced a predetermined distance apart; and The method further comprises removing, by a beamformer, a phase difference between sound signals obtained by the first microphone and the second microphone and then summing the sound signals.

The separating of the signal having a frequency of the predetermined cutoff frequency or more of the obtained sound signals by the filter includes passing, by the filter, a signal having a frequency of the predetermined cutoff frequency or more of the sound signals summed by the beamformer.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, the present disclosure will be described in detail with reference to the accompanying drawings.

Figure 1:
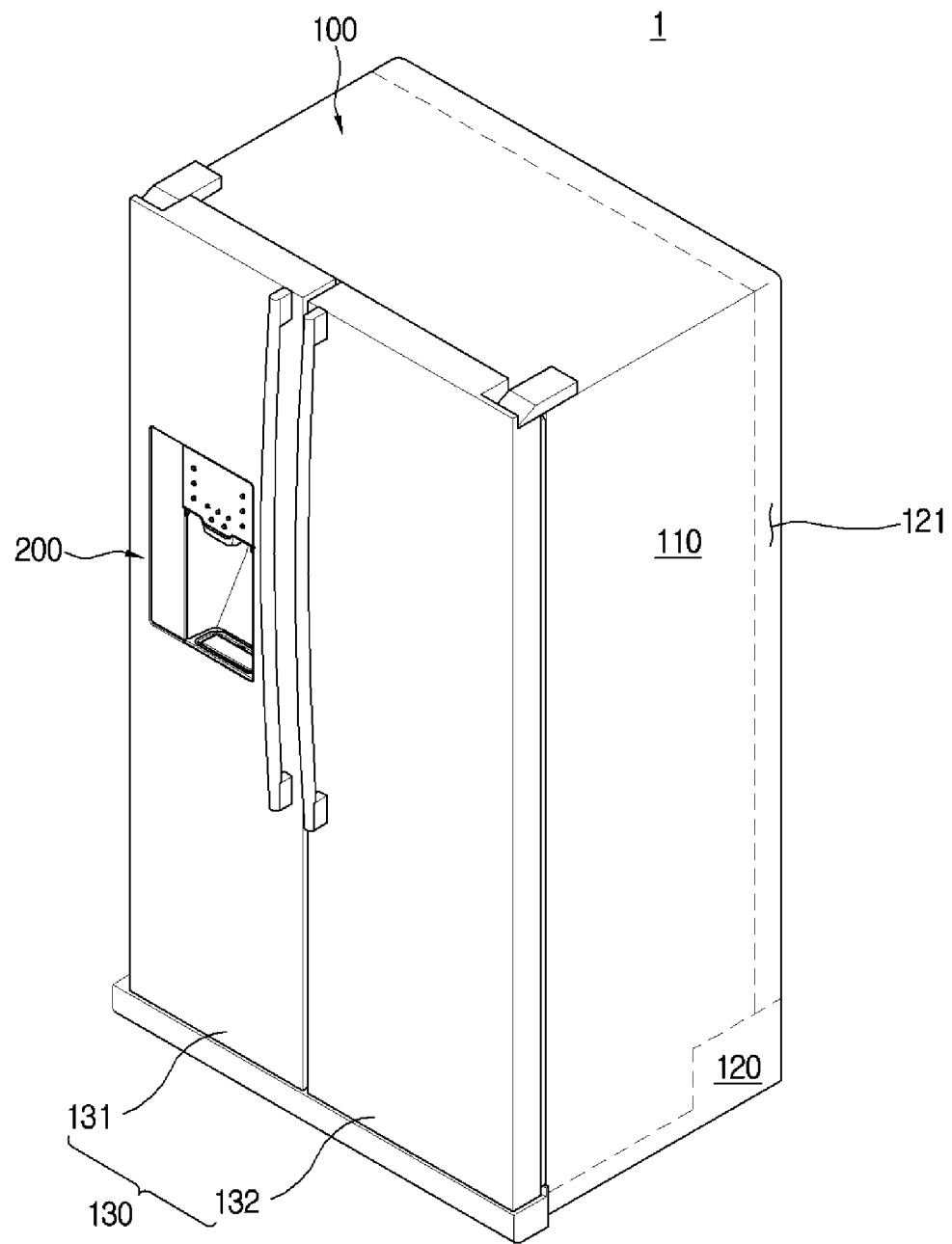
FIG. 1 is a perspective view of a refrigerator according to one embodiment.
Figure 2:
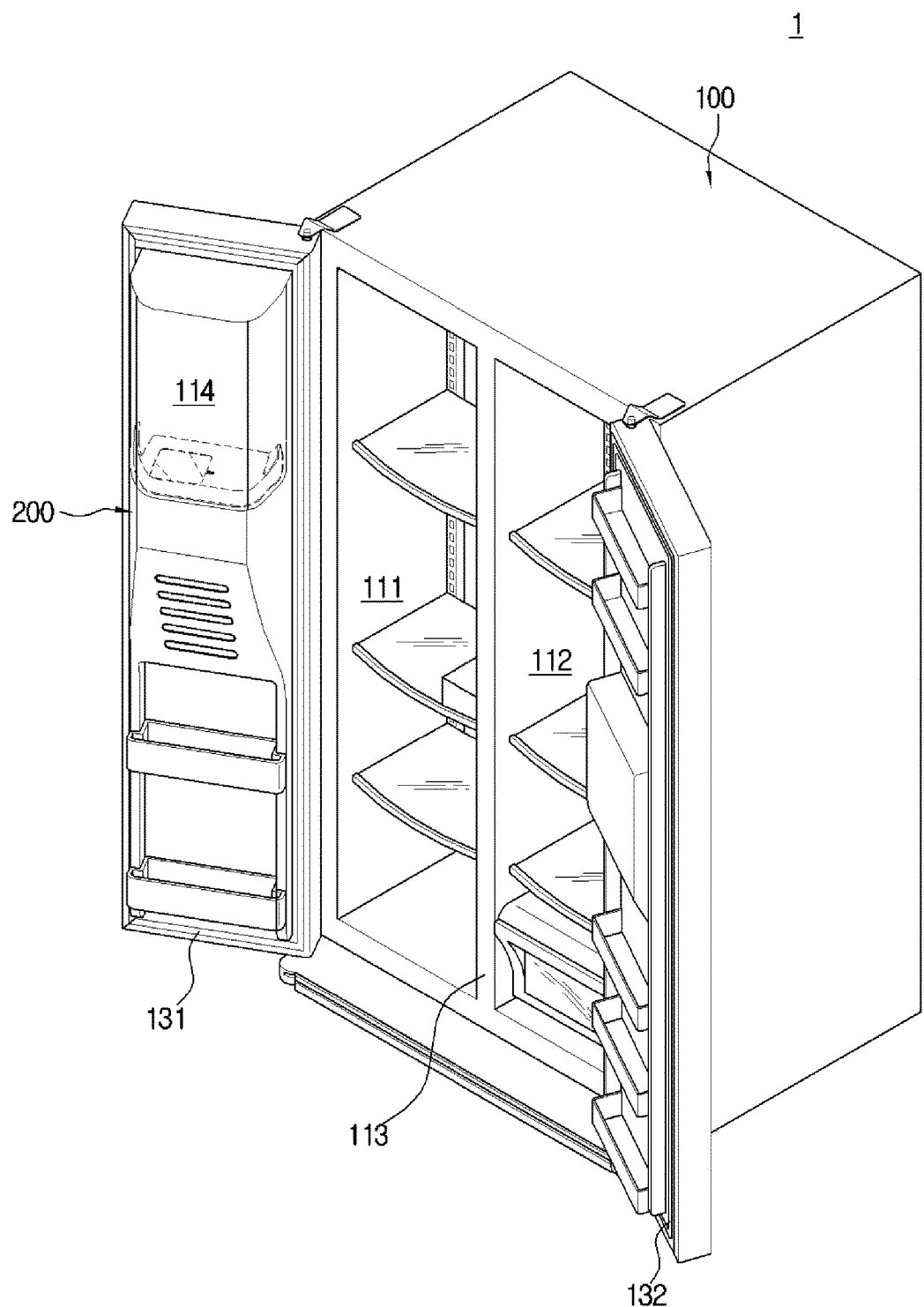
FIG. 2 is a view of an exemplary inside of the refrigerator according to one embodiment.

FIG. 1 is a perspective view of a refrigerator according to one embodiment, and FIG. 2 is a view of an exemplary inside of the refrigerator according to one embodiment.

As illustrated in FIG. 1, a refrigerator 1 includes a main body 100, which forms an exterior thereof and is provided with a storage compartment 110 and a machine compartment 120 therein, and a dispenser 200 which supplies water, ice, and carbon dioxide and water for producing carbonated water.

As illustrated in FIG. 2, the storage compartment 110 of the refrigerator 1 is an accommodating space formed in the main body 100, an intermediate partition 113 is provided in the accommodating space, and the accommodating space in the main body 100 is divided into a left part and a right part by the intermediate partition 113.

That is, the storage compartment 110 includes a freezer compartment 111 and a refrigerator compartment 112 which are divided into the left part and the right part by the intermediate partition 113.

Here, the freezer compartment 111 may be kept at a temperature of about minus 18.5° C. to maintain food in a frozen state, and the refrigerator compartment 112 may be maintained at a temperature of about 3° C. to keep food in a refrigerated state.

Shelves and storage boxes for storing food are mounted inside the freezer compartment 111 and the refrigerator compartment 112.

The storage compartment 110 may further include an ice-making compartment 114 which makes ice, and the ice-making compartment 114 may be provided inside the freezer compartment 111.

Alternatively, the ice-making compartment 114 may be provided in the refrigerator compartment 112.

A compressor (not illustrated) which compresses refrigerant and discharges the refrigerant in a high-temperature and high-pressure state, a condenser (not illustrated) which condenses the refrigerant compressed in the compressor in the high-temperature and high-pressure state through heat dissipation, and a fan for condensing (not illustrated) which cools the condenser are disposed in the machine compartment 120.

A duct 121 in which air flows is formed in an internal space of the main body 100, and an evaporator (not illustrated), which cools surrounding air by a cooling action in which surrounding latent heat is absorbed while evaporating the refrigerant provided from the condenser (not illustrated), and a fan for evaporation (not illustrated), which transfers air heat-exchanged in the evaporator, are disposed in the duct 121.

That is, the evaporator serves to lower a temperature of the storage compartment 110 (111 and 112).

Such evaporators may be respectively positioned at a duct corresponding to the freezer compartment 111, a duct corresponding to the refrigerator compartment 112, and a duct corresponding to the ice-making compartment 114.

Alternatively, the evaporator may be positioned only at the duct corresponding to the freezer compartment 111.

The main body 100 includes a plurality of holes provided at walls of the storage compartment 110.

The plurality of holes are paths through which the air in the duct 121 and the storage compartment 110 is moved to another space. That is, the air is moved between the duct 121 and the storage compartment 110 through the plurality of holes.

The refrigerator 1 further includes doors 130 (131 and 132) which are respectively provided at openings of front surfaces of the freezer compartment 111 and the refrigerator compartment 112 to open and close the freezer compartment 111 and the refrigerator compartment 112, respectively.

The doors 130 (131 and 132) shield the freezer compartment 111 and the refrigerator compartment 112 from the outside. A plurality of door shelves for storing food are mounted on an inner surface of each of the doors 130 (131 and 132).

The refrigerator 1 further includes the dispenser 200 which supplies water or ice to a user without the doors being opened and supplies water and carbon dioxide for producing carbonated water.

The dispenser 200 may be provided in the door 131 of the freezer compartment 111 or the door 132 of the refrigerator compartment 112.

Alternatively, unlike the embodiment of FIGS. 1 and 2, a refrigerator may have an accommodating space, which is divided into an upper part and a lower part by an intermediate partition, inside a main body thereof.

Such a refrigerator includes a refrigerator compartment, which is an upper space of a storage compartment, and a freezer compartment, which is a lower space of the storage compartment, and further includes a door for the refrigerator compartment which opens and closes the refrigerator compartment and a door for the freezer compartment which opens and closes the freezer compartment.

The door for the refrigerator compartment may be rotatable and may be provided in a side-by-side type, and the door for the freezer compartment may be forwardly slidable and may be provided in a drawer type.

An ice-making compartment which generates ice may be provided in the refrigerator compartment, and a tank which stores water supplied from an external water supply source may be provided in the refrigerator compartment. The water stored in the tank may be water purified by a water purifying filter.

Such a refrigerator may further include a dispenser which is provided in any one of a pair of doors for the refrigerator compartment, supplies the water in the tank or ice in the ice-making compartment to the user without the door being opened, and supplies water and carbon dioxide for producing carbonated water.

That is, the dispenser may be provided in a refrigerator having French-type doors as well as the refrigerator having the side-by-side doors illustrated in FIGS. 1 and 2.

As such, the dispenser 200 provided in the refrigerator may include a carbonated water producing apparatus 200a which supplies water and carbon dioxide for producing carbonated water, and may further include a water purifier which supplies purified water other than carbonated water and an ice supplier which receives ice and discharges the ice.

Such a dispenser 200 will be described with reference to FIGS. 3 to 6.

Figure 3:
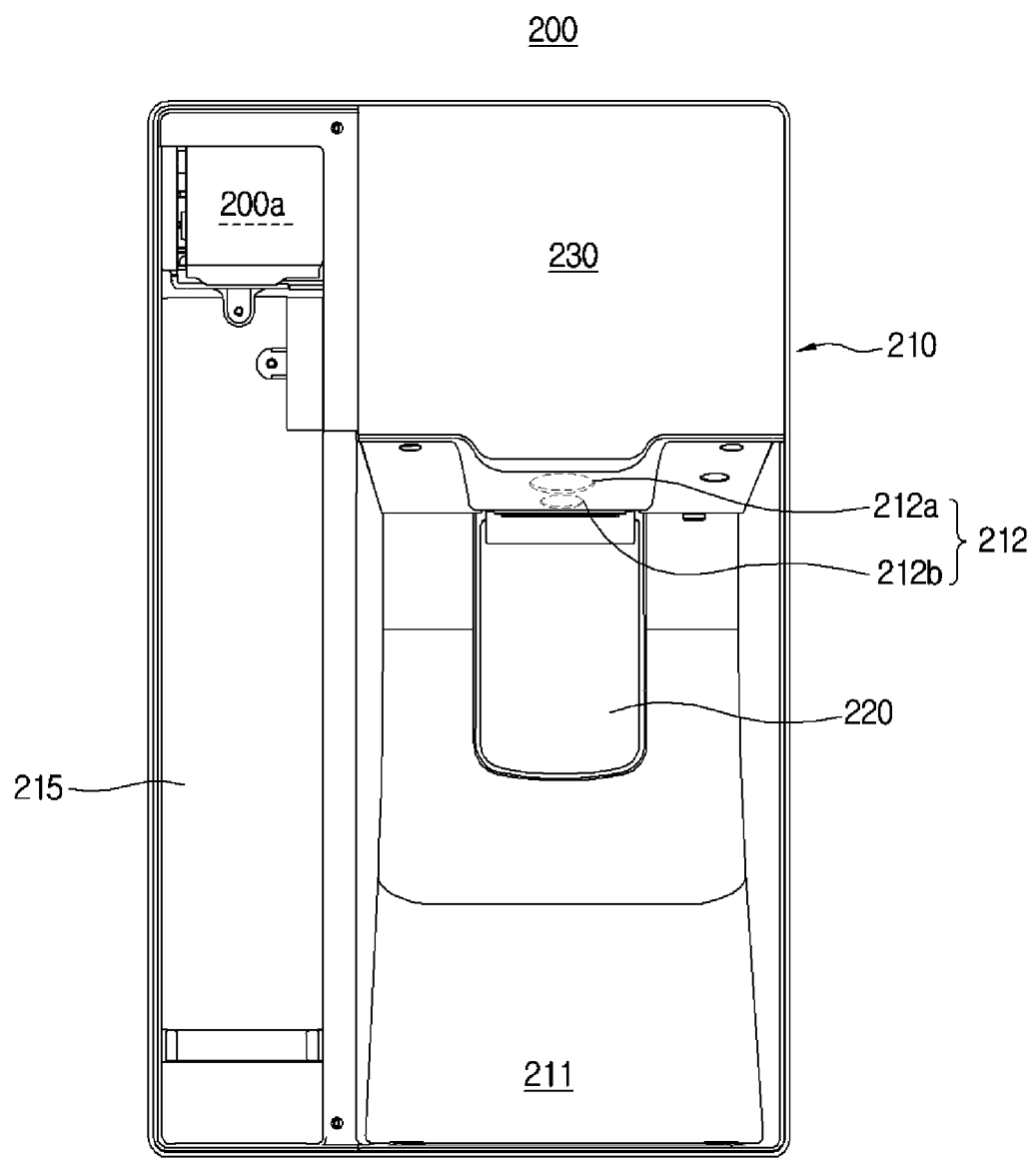
FIG. 3 is a front view of the dispenser provided in the refrigerator according to one embodiment.
Figure 4:
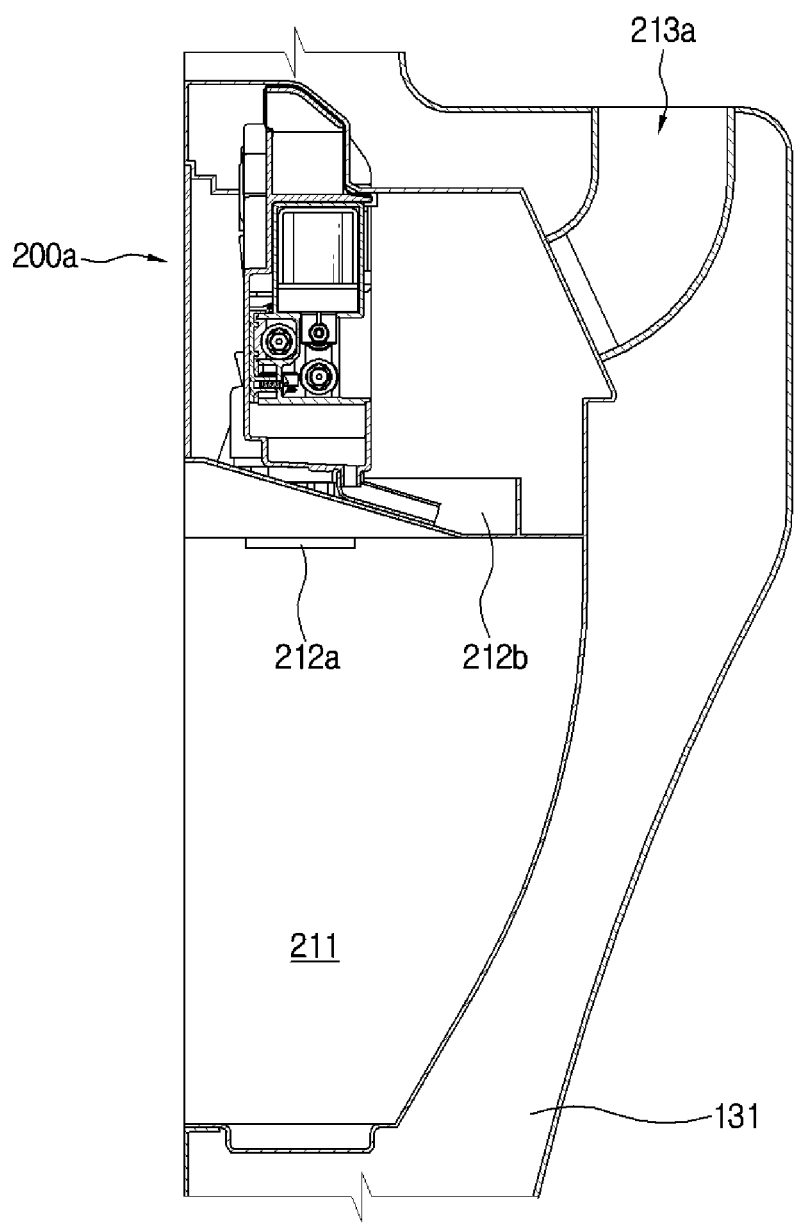
FIG. 4 is a cross-sectional view of the dispenser illustrated in FIG. 3.
Figure 5:
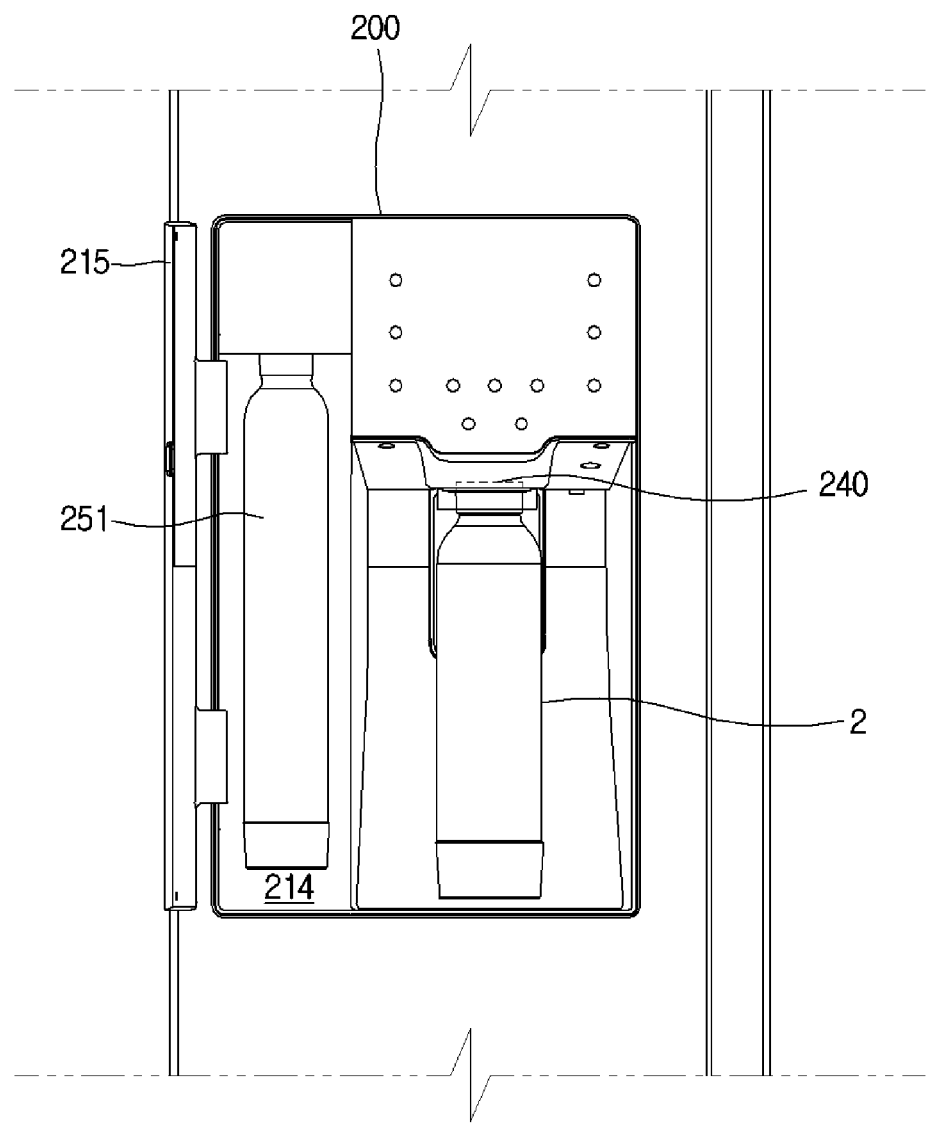
FIG. 5 is a view of an exemplary container fastened to the dispenser illustrated in FIG. 3.

FIG. 3 is a front view of the dispenser provided in the refrigerator according to one embodiment, FIG. 4 is a cross-sectional view of the dispenser illustrated in FIG. 3, and FIG. 5 is a view of an exemplary container fastened to the dispenser illustrated in FIG. 3.

The dispenser 200 includes a housing 210 disposed in an accommodating groove of the door 131 for the freezer compartment and a lever 220 which opens and closes an opening-and-closing member provided in a discharger 212 when ice or water is discharged, and further includes a user interface unit 230 which receives and outputs carbonated water production information and water and ice discharge information.

More specifically, as illustrated in FIGS. 3 and 4, the housing 210 includes a recessed unit 211 which is inwardly recessed from a front surface thereof and forms a space for receiving an object, and the discharger 212 which is disposed above the recessed unit 211 and discharges the object.

The discharger 212 includes a first discharge port 212a which discharges water and carbon dioxide for producing carbonated water, and a second discharge port 212b which discharges water or ice.

A first water supply pipe, which supplies water for producing carbonated water, and a nozzle for injecting carbon dioxide may be disposed in the first discharge port 212a, and a second water supply pipe for discharging purified water and an ice supply pipe 213a for discharging ice may be disposed in the second discharge port 212b.

That is, the dispenser 200 further includes the second water supply pipe for discharging purified water and the ice supply pipe 213a for discharging ice.

The dispenser 200 further includes the carbonated water producing apparatus 200a having the first water supply pipe which supplies water and a nozzle for jetting carbon dioxide.

As illustrated in FIG. 5, the carbonated water producing apparatus 200a may be provided inside the housing 210 of the dispenser 200.

The housing 210 of the dispenser 200 further includes an accommodation unit 214 which accommodates a carbon dioxide cylinder 251, and a cover 215 which opens and closes the accommodation unit 214.

A container 2 which receives water and carbon dioxide for producing carbonated water is detachably fastened to the first discharge port 212a of the dispenser 200. That is, the container 2 may be detachably fastened to the carbonated water producing apparatus 200a of the dispenser 200 through the first discharge port 212a. As such, after the container 2 is fastened to the carbonated water producing apparatus 200a, the container 2 receives water and carbon dioxide, the carbon dioxide dissolves in the water at this time, and thus carbonated water may be immediately produced.

The carbonated water producing apparatus 200a which produces carbonated water using the container 2 detachably fastened thereto will be described with reference to FIGS. 6 and 7.

Figure 6:
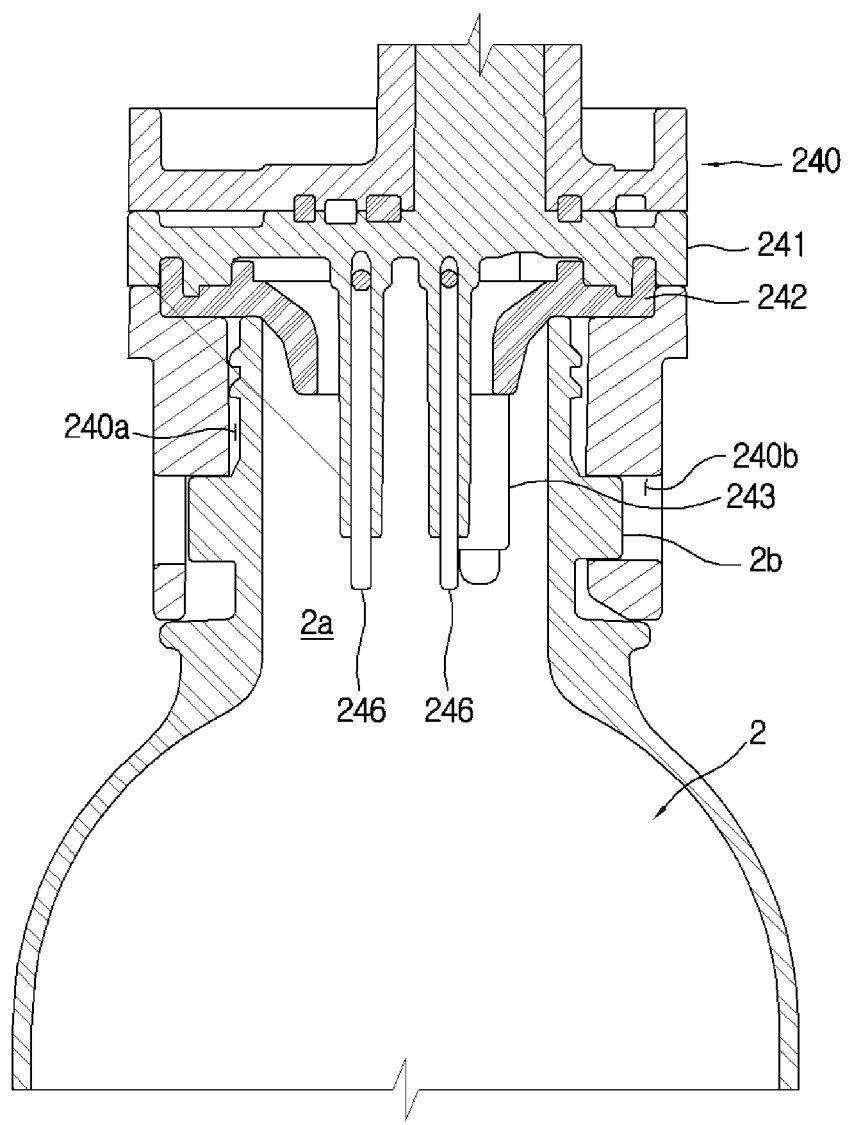
FIG. 6 is a view of a fastening structure of the carbonated water producing apparatus and the container of the dispenser illustrated in FIG. 5.
Figure 7:
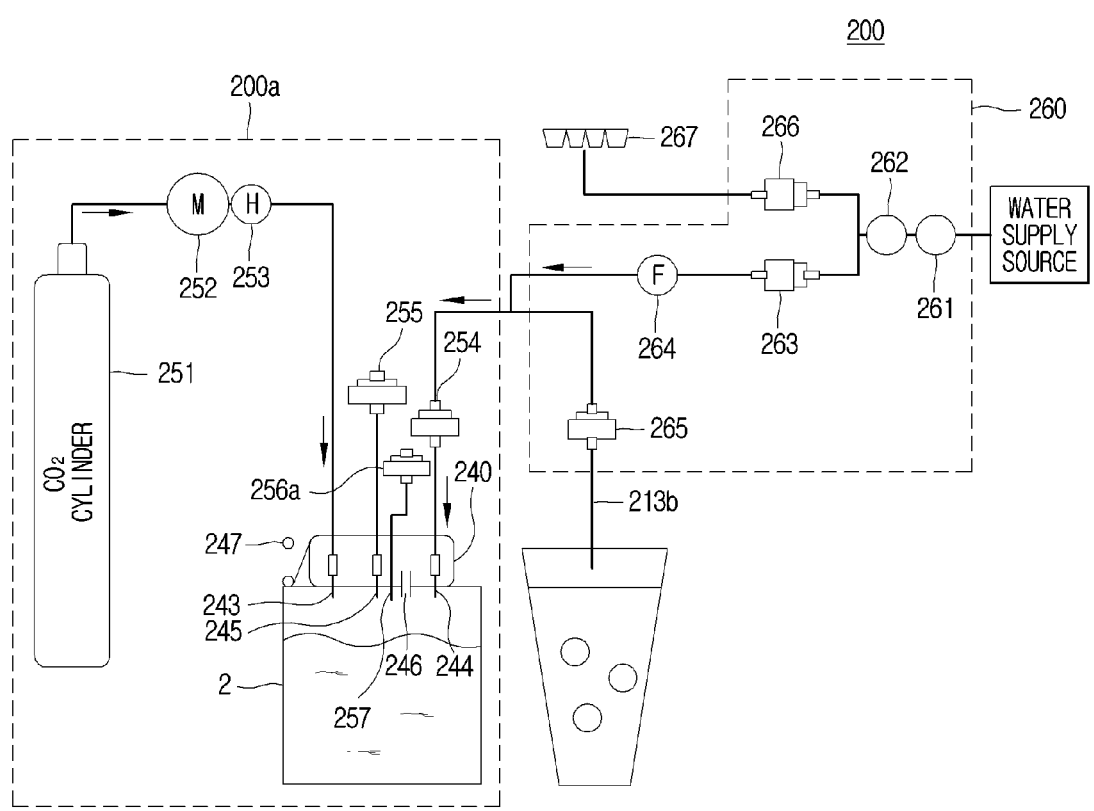
FIG. 7 is a schematic diagram of the carbonated water producing apparatus according to one embodiment.

FIG. 6 is a view of a fastening structure of the carbonated water producing apparatus and the container of the dispenser illustrated in FIG. 5, and FIG. 7 is a schematic diagram of the carbonated water producing apparatus 200a according to one embodiment.

As illustrated in FIG. 6, the carbonated water producing apparatus 200a includes a fastener 240 detachably fastened to the container 2. Here, the fastener 240 may be disposed in the first discharge port 212a of the dispenser.

The fastener 240 includes a body 241 having an insertion groove 240a into which an inlet 2a of the container 2 is inserted and a mounting groove 240b on which a protrusion 2b of the container 2 is mounted, a packing member 242, which is disposed in the insertion groove 240a of the body 241, comes into close contact with the inlet 2a of the container 2 when the container 2 is inserted in the insertion groove 240a, and prevents water and carbon dioxide inside the container 2 from leaking to the outside, and a nozzle 243 which is disposed to be movable in the body 241 and jets the carbon dioxide.

The packing member 242 includes a plurality of holes. The nozzle 243 is disposed to pass through any one of the plurality of holes of the packing member 242. That is, the nozzle 243 reciprocates in the container 2.

A first water supply pipe 244 and a pressure adjusting pipe 245 may be disposed in the body 241 of the fastener 240, and the first water supply pipe 244 and the pressure adjusting pipe 245 may also be disposed to pass through the holes of the packing member 242.

That is, since the first water supply pipe 244 and the pressure adjusting pipe 245 are disposed to pass through the holes of the packing member 242, the first water supply pipe 244 and the pressure adjusting pipe 245 may be positioned inside the container 2 that is closed to the outside.

Further, a water level detector 246 which detects a water level of the container 2 and a fastening detector 247 which detects whether the container 2 is fastened may be selectively disposed in the body 241 of the fastener 240.

Here, the water level detector 246 may be a moisture detector which detects overflow of water inside the container 2, and may include an electrode. The fastening detector 247 may include a micro switch.

A configuration of the carbonated water producing apparatus 200a will be described in detail with reference to FIG. 7, and a configuration of the water purifier connected to the carbonated water producing apparatus 200a will also be described with reference to FIG. 7.

The carbonated water producing apparatus 200a includes a cylinder 251 which stores carbon dioxide and discharges the stored carbon dioxide when carbonated water is produced, an interrupter 252 which is disposed between an outlet of the cylinder 251 and the nozzle 243 and interrupts a flow of the carbon dioxide which moves from the cylinder 251 to the nozzle 243, and a rotational angle detector 253 which detects an operational state of the interrupter 252.

Here, the interrupter 252 may include a motor, and the rotational angle detector 253 may include a hall sensor that detects a rotational angle of the motor.

The carbonated water producing apparatus 200a includes a first adjuster 254 which is provided in the first water supply pipe 244 and adjusts an amount of purified water supplied from an external tank to the container 2, and a second adjuster 255 which is provided in the pressure adjusting pipe 245 and adjusts pressure in the container 2.

Here, the first adjuster 254 may include a first valve, and the second adjuster 255 may include a second valve. The first valve may be a double check (DC) valve, and the second valve may be a vent valve.

The water purifier may be connected to an external water supply source such as a spigot, and may include a tank 262 which stores purified water purified through a water purifying filter 261, a third adjuster 263 which is connected to the tank 262 and supplies the purified water stored in the tank 262 or blocks the supply of the purified water, a flow rate detector 264 which detects an amount of the purified water supplied from the third adjuster 263, and a fourth adjuster 265 which adjusts an amount of the purified water supplied to the second water supply pipe 213b through the third adjuster 263.

The water purifier may further include a fifth adjuster 266 which supplies the purified water in the tank 262 to an ice-making apparatus 267 of the ice-making compartment.

Here, each of the third adjuster 263 and the fifth adjuster 266 includes a solenoid valve, and the fourth adjuster 265 includes a DC valve. Further, the water of the water supply source may be directly supplied to the second water supply pipe 213b and the ice-making apparatus 267 without purifying the water of the water supply source. In this case, the third adjuster 263 and the fifth adjuster 266 block a strong pressure of the water supply source and adjust the supply of the water to the second water supply pipe 213b and the ice-making apparatus 267.

The ice-making apparatus 267 is positioned at the ice-making compartment 114 and includes an ice-maker, which receives purified water to generate ice therein, and a storage unit, which stores the generated ice therein. The storage unit is connected to the ice supply pipe 213a of the ice supplier of the dispenser and discharges the stored ice to the ice supply pipe 213a of the ice supplier in response to an ice discharge command.

Figure 8:
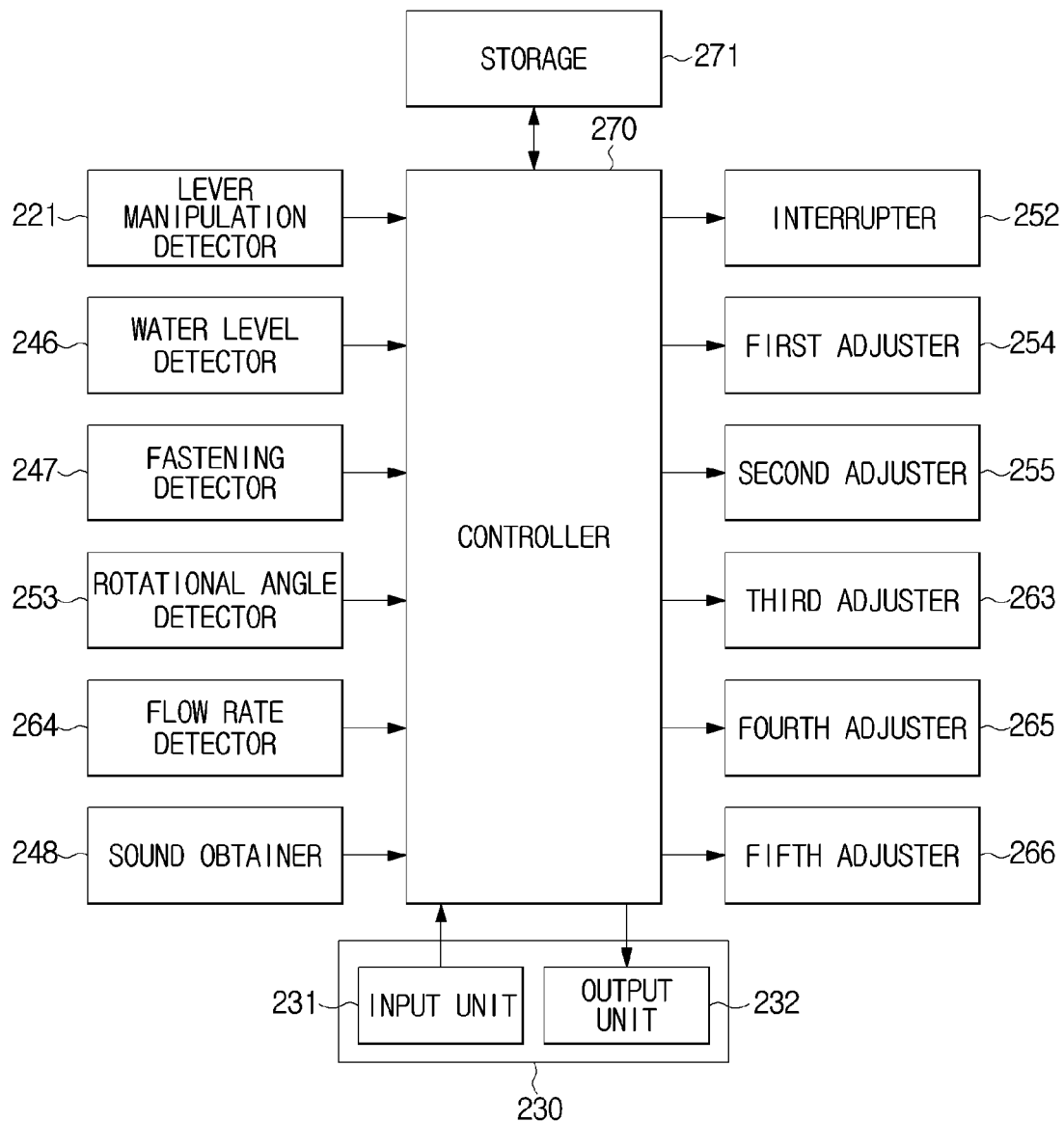
FIG. 8 is a control block diagram of the refrigerator according to one embodiment.

FIG. 8 is a control block diagram of the refrigerator according to one embodiment.

The refrigerator includes a user interface unit 230, a plurality of detectors, a sound obtainer 248, a controller 270, and a storage 271 which are components for controlling the dispenser.

The user interface unit 230 includes an input unit 231 which receives an operation command of the refrigerator, and an output unit 232 which displays operation information of the refrigerator.

Such a user interface unit 230 will be described with reference to FIGS. 9, 10A, and 10B.

Figure 9:
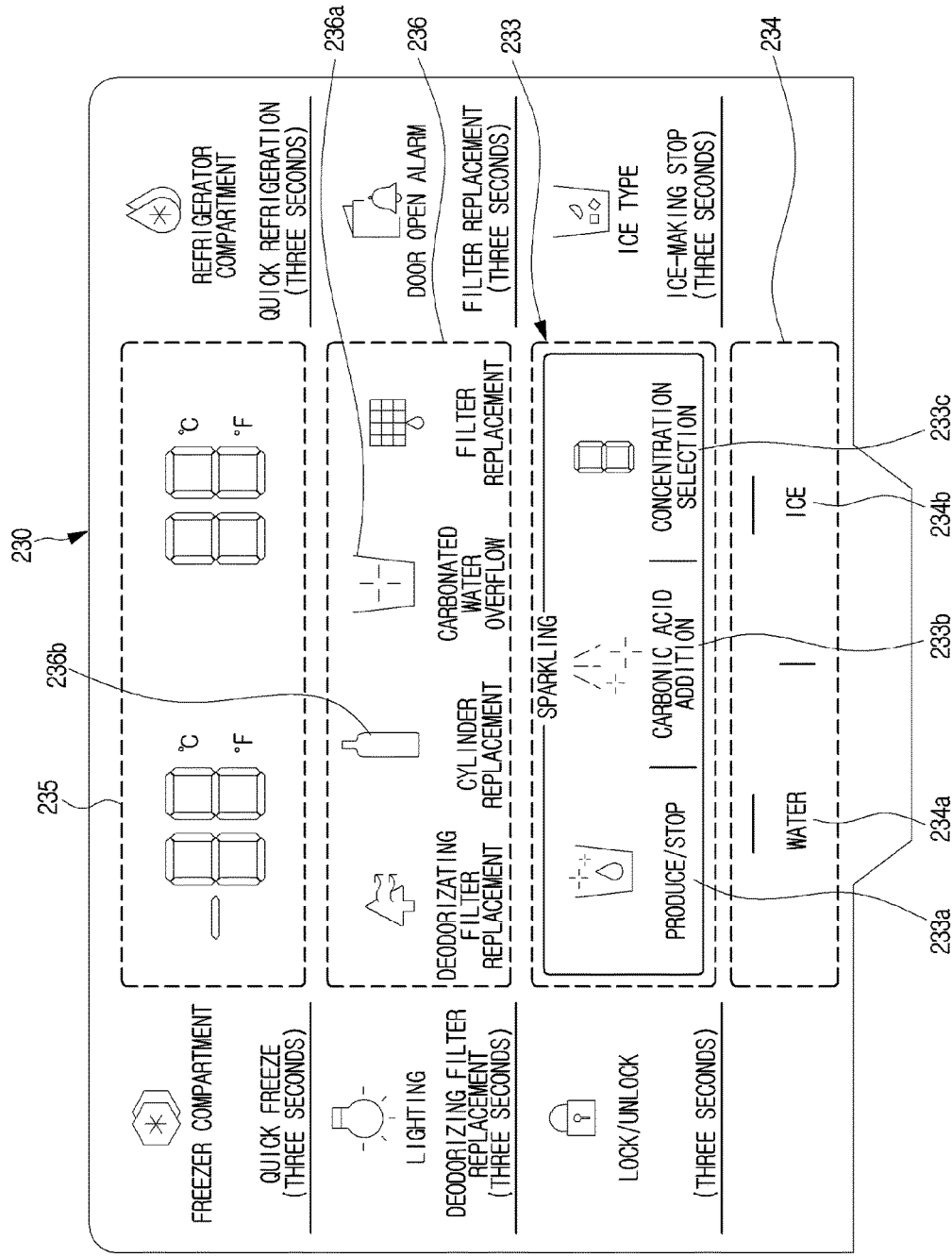
FIGS. 9, 10a and 10b are a view of an exemplary user interface unit of the refrigerator according to one embodiment.

As illustrated in FIG. 9, the input unit 231 and the output unit 232 of the user interface unit 230 may be integrally implemented.

The input unit 231 may be implemented as a plurality of buttons or a touch panel.

Figure 10A:
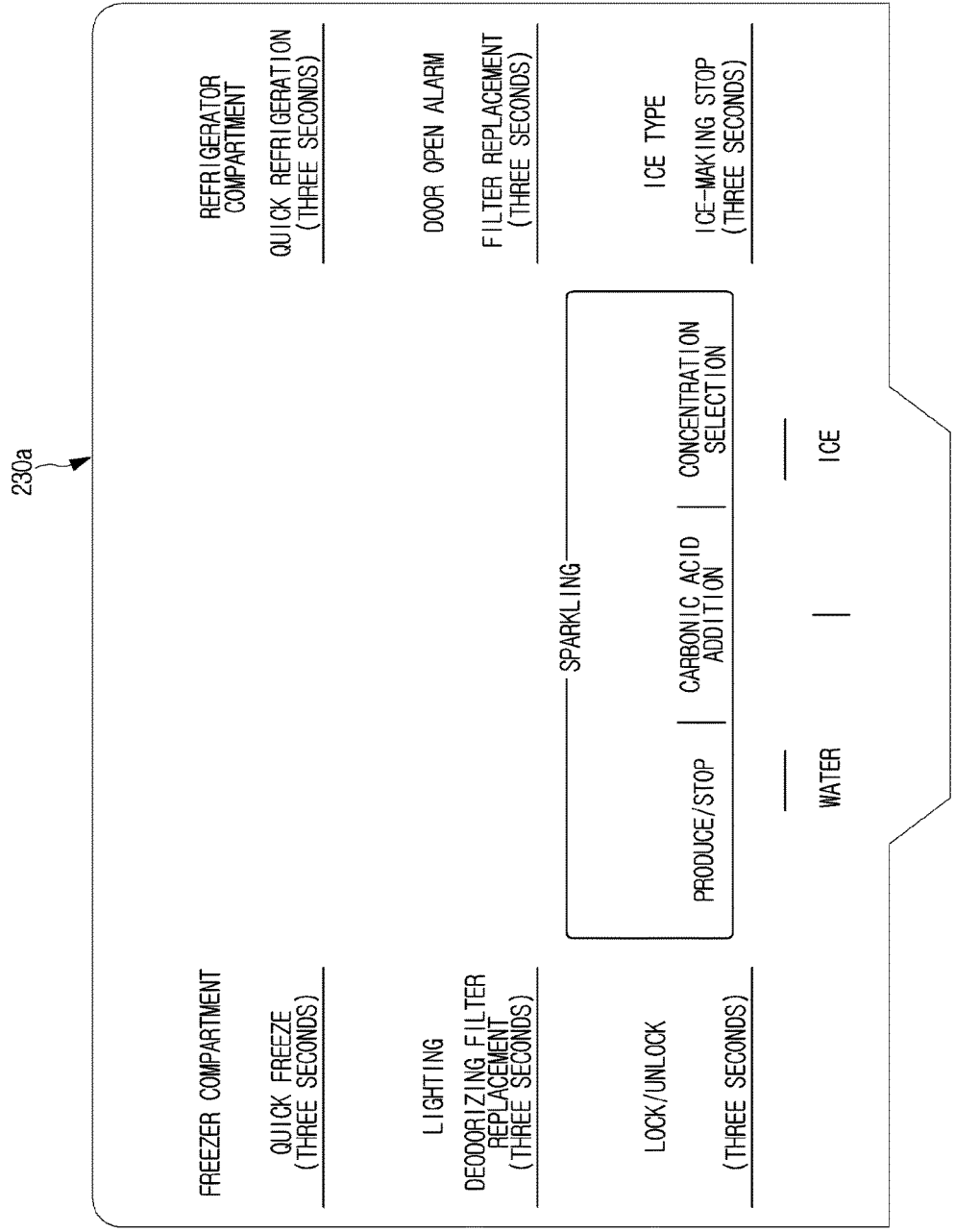
Figure 10B:
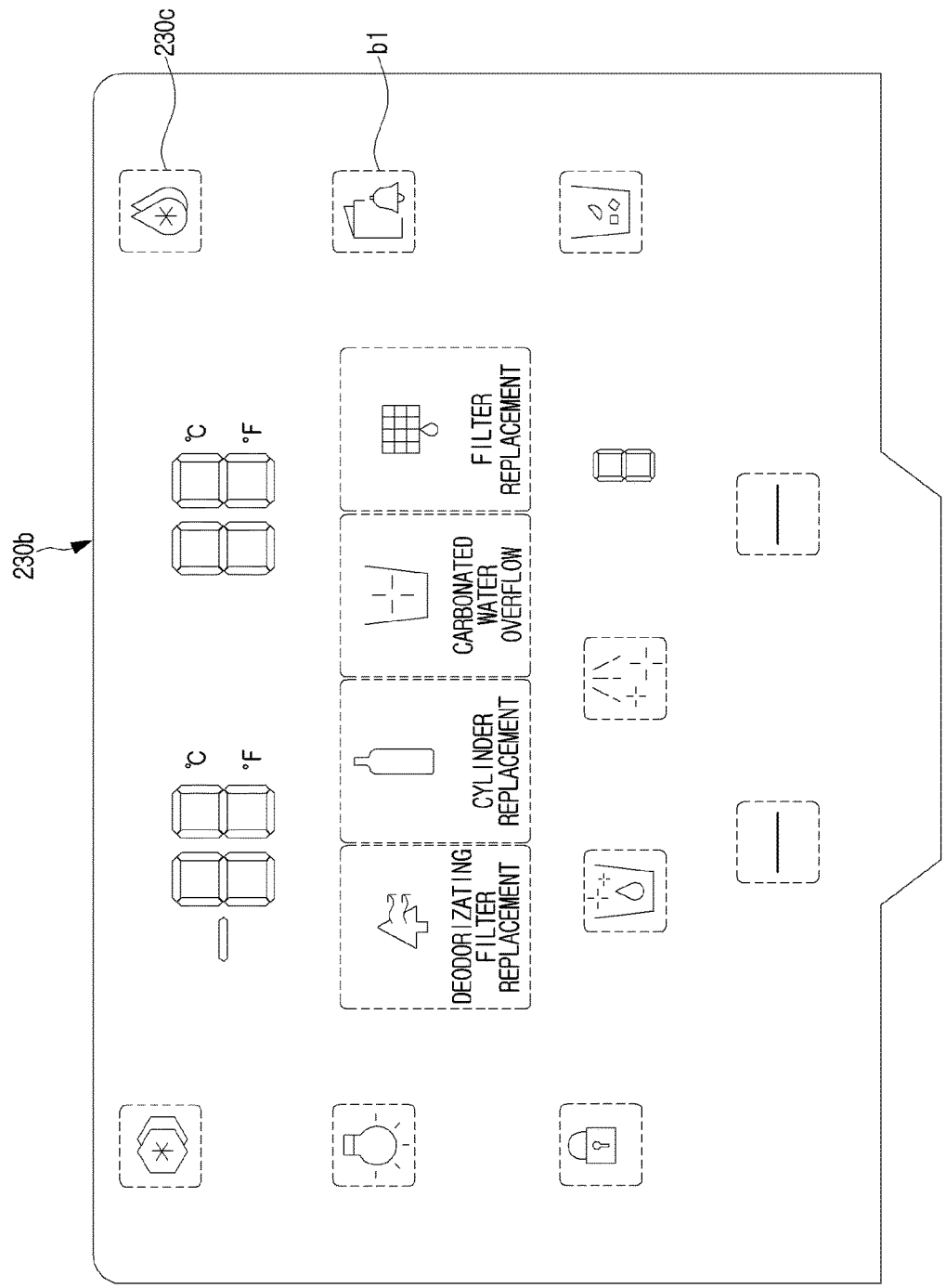

As illustrated in FIGS. 10A and 10B, the output unit 232 may include a display film 230a on which text is printed, an inlay film 230b on which text and an icon b1 are carved, and a lamp 230c which provides light to the text and the icon b1 of the inlay film 230b.

That is, the user interface unit 230 outputs light from the lamp 230c to the outside through the text and the icon b1 of the inlay film 230b to notify the user of operation information of the refrigerator.

Further, when the input unit 231 is formed to have a plurality of buttons (not illustrated), the plurality of buttons may be disposed at positions corresponding to the text and the icon b1 of the inlay film 230b.

The user interface unit 230 includes a first input-and-output unit 233, which receives an operation command corresponding to carbonated water production and displays operation information corresponding to the carbonated water production, and a second input-and-output unit 234, which receives a purified water or ice discharge command and displays purified water or ice discharge information.

More specifically the first input-and-output unit 233 includes a first carbonated water information area 233a, which receives a carbonated water producing command and a stop command from the user and displays whether carbonated water is produced, a second carbonated water information area 233b, which receives a concentration of carbonated water from the user and displays the received concentration of the carbonated water, and a third carbonated water information area 233c, which receives a carbonic acid addition command from the user and displays whether carbonic acid is added.

The second carbonated water information area 233b may include a seven-segment display which displays the concentration of the carbonated water as a number.

The second input-and-output unit 234 includes a first discharge information area 234a, which receives a purified water discharge command and displays purified water discharge information, and a second discharge information area 234b, which receives the ice discharge command and displays ice discharge information.

Further, the user interface unit 230 further includes a third input-and-output unit 235, which receives target temperatures of the freezer compartment and the refrigerator compartment and displays the received target temperatures of the freezer compartment and the refrigerator compartment.

The third input-and-output unit 235 may include a plurality of seven-segment displays which display the target temperatures of the freezer compartment and the refrigerator compartment.

The user interface unit 230 includes an alarm output unit 236 which outputs alarm information.

The alarm output unit 236 includes a water overflow alarm display 236a which notifies the user of water overflow of the container 2 when carbonated water is produced. Further, the alarm output unit 236 may include a cylinder replacement display 236b which notifies the user of cylinder replacement.

Further, the user interface unit 230 may receive a function such as special freezing, in which a target temperature is set to about minus 30° C., removing of microorganisms/deodorizing, or the like, and display operation information of the received function.

Further, the input unit 231 may be implemented as a touch panel, and the output unit 232 may be implemented as a flat display panel such as a liquid crystal display (LCD), a plasma display panel (PDP), an organic light-emitting diode (OLED), or the like.

That is, the user interface unit 230 may be implemented as a touch screen in which a touch panel and a flat display panel are integrally formed.

The plurality of detectors include a lever manipulation detector 221 which detects whether the lever 220, which instructs that purified water be discharged or that water be discharged, is pressed, the water level detector 246 which detects a level of water supplied into the container 2, the fastening detector 247 which detects whether the container 2 is fastened to the fastener 240 of the carbonated water producing apparatus, the rotational angle detector 253 which detects operation information of the interrupter 252 which interrupts the discharge of the carbon dioxide of the cylinder 251, and the flow rate detector 264 which detects an amount of purified water supplied from the tank.

The sound obtainer 248 obtains a sound generated when the carbon dioxide is supplied from the cylinder through the nozzle 243. A detailed description thereof will be described below.

Here, each of the detectors 221, 246, 247, 253, and 264 and the sound obtainer 248 transmit detected signals to the controller 270.

The controller 270 controls operations of the dispenser 200 based on the signals detected by the plurality of detectors, a sound signal obtained by the sound obtainer 248, and a signal of the input unit 231 of the user interface unit 230.

Here, the control of the operations of the dispenser 200 includes controlling opening and closing the first adjuster 254, the second adjuster 255, the third adjuster 263, the fourth adjuster 265, and the fifth adjuster 266, and controlling rotation of the interrupter 252.

More specifically, the controller 270 determines a current amount of purified water stored in the tank 262. When the determined current amount of purified water is a predetermined amount or less, the controller 270 controls water supply of the water supply source, controls filtering the water of the water supply source, and controls the filtered purified water to be stored in the tank 262.

The controller 270 may control as much water as is insufficient in the tank 262 to be supplied from the water supply source and to be filtered.

Here, the amount of purified water that is insufficient may be determined from a difference between a maximum amount of purified water which is storable in the tank 262 and a current amount of purified water.

Further, the current amount of purified water may be determined based on a signal detected by the water level detector (not illustrated) provided in the tank 262.

The controller 270 determines whether the container 2 is fastened to the fastener 240 by checking a detection signal of the fastening detector 247. When it is determined that the container 2 is fastened to the fastener 240, the controller 270 controls the first input-and-output unit 233 to be activated.

The controller 270 controls the lamp 230c provided in the first input-and-output unit 233 to be turned on when the first input-and-output unit 233 is controlled to be activated.

The controller 270 determines whether the first carbonated water information area 233a is selected while the first input-and-output unit 233 is activated. When it is determined that the first carbonated water information area 233a is selected, the controller 270 controls the first adjuster 254 and the third adjuster 263 to be opened so that the purified water stored in the tank 262 is supplied into the container 2.

The determination of whether the first carbonated water information area 233a is selected includes determining whether a signal corresponding to the carbonated water producing command is input to the first input-and-output unit 233.

The controller 270 determines an amount of the purified water supplied into the container 2 based on a detection signal of the flow rate detector 264 when supplying the purified water, and compares the determined amount of the purified water with a first reference amount. When the determined amount of the purified water is the first reference amount, the controller 270 controls the first adjuster 254 and the third adjuster 263 to be closed so that the supply of the purified water is blocked.

The controller 270 may control the purified water to be supplied for a predetermined time when supplying the purified water. When the supply of the purified water is completed, the controller 270 may control the first adjuster 254 and the third adjuster 263 to be closed.

Further, the controller 270 controls the second adjuster 255 to be open before the purified water is supplied in order to prevent the pressure of the container 2 from increasing according to the supply of the purified water.

Thus, a path of the pressure adjusting pipe 245 inserted into the container 2 is open.

That is, in a case in which the carbonated water producing command is input, the controller 270 controls the first adjuster 254 and the third adjuster 263 to be opened when a first time has elapsed from a time point at which the second adjuster 255 is open.

The controller 270 determines whether the water level of the purified water inside the container 2 is a predetermined water level or more when the supply of the purified water is completed. When it is determined that the water level of the purified water inside the container 2 is the predetermined water level or more, the controller 270 controls the carbonated water production to be stopped.

The determination of whether the water level of the purified water inside the container 2 is the predetermined water level or more includes determining, by the flow rate detector, whether the water level of the purified water inside the container 2 is the predetermined water level or more by an amount of water previously stored in the container 2 before supplying the purified water even though less than the predetermined water level of purified water is supplied in the container.

In this case, the controller 270 controls the first input-and-output unit 233 to be deactivated, and controls the water overflow icon to be illuminated by controlling the operation of the lamp 230c disposed on the water overflow alarm display 236a of the alarm output unit 236.

Thus, the user may recognize a water overflow state of the container 2.

As such, the purified water of the container 2 may be maintained at the predetermined amount based on the detection signal of the flow rate detector 264 and the detection signal of the water level detector 246.

When it is determined that the water level of the purified water inside the container 2 is less than the predetermined water level in a state in which the supply of the purified water is completed, the controller 270 controls the operation of the interrupter 252 so that the carbon dioxide in the cylinder 251 is discharged, and controls a rotational angle of the interrupter 252 based on a detection signal of the rotational angle detector 253. Here, the interrupter 252 may include a motor, and the rotational angle detector 253 may include a hall sensor that detects a rotational angle of the motor.

Thus, the cylinder 251 may discharge a predetermined amount of carbon dioxide at a predetermined pressure.

Further, the controller 270 controls the operation of the interrupter 252 when a second time has elapsed from a time point at which the water supply is completed.

When a third time has elapsed from a time point at which the discharge of the carbon dioxide is completed, the controller 270 controls the second adjuster 255 to be opened in order to reduce the pressure in the container 2.

When the carbonated water production is completed, the controller 270 may control carbonated water production completion information to be displayed.

The controller 270 determines whether the first carbonated water information area 233a is reselected during the carbonated water production. When it is determined that the first carbonated water information area 233a is reselected, the controller 270 controls the carbonated water production to be stopped.

Here, the determination of whether the first carbonated water information area 233a is reselected includes determining whether a signal corresponding to a carbonated water production stop command is input.

The controller 270 determines a concentration of the carbonated water, which is set before the carbonated water production, and controls carbon dioxide to be jetted at the number of times corresponding to the determined concentration thereof.

The controller 270 controls the nozzle to be moved downward so that the nozzle is immersed in the water in the container 2 before the carbon dioxide is jetted. When the jet of the carbon dioxide is completed, the controller 270 controls the nozzle to be moved upward.

Further, the controller 270 controls the pressure in the container 2 to be reduced by controlling the second adjuster to be opened each time the carbon dioxide is jetted.

The controller 270 determines whether the third carbonated water information area 233c is selected when the carbonated water production is completed. When it is determined that the third carbonated water information area 233c is selected, the controller 270 controls the carbon dioxide to be additionally jetted into the container 2 by controlling the operation of the interrupter 252.

Here, the determination of whether the third carbonated water information area 233c is selected includes determining whether a signal corresponding to a carbonic acid addition jet command is input.

The controller 270 controls the water level detector which detects the water level of the container 2 to be deactivated when the carbon dioxide is jetted.

Thus, the water level of the container may be detected to be the determined water level or more due to sloshing of the water inside the container 2 by the jet of the carbon dioxide, and thus the carbonated water production may be prevented from stopping.

The controller 270 determines whether the third carbonated water information area 233c is reselected within a predetermined time. When it is determined that the third carbonated water information area 233c is reselected, the controller 270 may determine that the carbonic acid addition jet command is canceled, and control the jet of the carbon dioxide to be stopped.

The controller 270 determines whether the container 2 is separated from the fastener 240 based on the detection signal of the fastening detector 247. When it is determined that the container 2 is separated from the fastener 240, the controller 270 controls the first input-and-output unit 233 to be deactivated.

In this case, the controller 270 controls the lamp 230c provided in the first input-and-output unit 233 to be turned off.

As such, carbonated water having a concentration desired by the user may be provided by producing carbonated water having the concentration of carbonated water set by the user or by producing carbonated water having an additionally increased concentration of carbonated water by the user. Further, since carbonated water is provided by being directly produced at a time point desired by the user, the quality of the carbonated water may be maintained whenever the carbonated water is produced.

The controller 270 determines whether the first discharge information area 234a of the second input-and-output unit 234 is selected in a state in which the container 2 is not fastened to the fastener 240. When it is determined that the first discharge information area 234a is selected, the controller 270 controls the lamp 230c of the first discharge information area 234a to be turned on.

Here, the determination of whether the first discharge information area is selected includes determining whether a signal corresponding to the purified water discharge command is input.

The controller 270 determines whether a manipulation signal is received from the lever manipulation detector 221 in a state in which the first discharge information area 234a is selected. When it is determined that a manipulation signal of the lever 220 is received, the controller 270 controls the third adjuster 263 and the fourth adjuster 265 to be opened.

The controller 270 determines an amount of purified water supplied based on the detection signal of the flow rate detector 264 during the purified water discharge, and compares the determined amount of the purified water with a second reference amount. When the determined amount of the purified water is the second reference amount, the controller 270 controls the third adjuster 263 and the fourth adjuster 265 to be closed so that the discharge of the purified water is stopped.

Further, the controller 270 may discharge purified water for a predetermined time by controlling the third adjuster 263 and the fourth adjuster 265 to be opened.

When the discharge of purified water is completed, the controller 270 controls the lamp 230c of the first discharge information area 234a to be turned off.

The controller 270 determines whether the second discharge information area 234b of the second input-and-output unit 234 is selected in the state in which the container 2 is not fastened to the fastener 240. When it is determined that the second discharge information area 234b is selected, the controller 270 controls the lamp 230c of the second discharge information area 234b to be turned on.

Here, the determination of whether the second discharge information area 234b is selected includes determining whether a signal corresponding to the ice discharge command is input.

The controller 270 determines whether the manipulation signal is received from the lever manipulation detector 221 in a state in which the second discharge information area 234b is selected. When it is determined that the manipulation signal of the lever 220 is received, the controller 270 discharges ice to the second discharge port 212b through the ice supply pipe 213a by controlling the opening-and-closing member (not illustrated) disposed on the ice supply pipe to be opened for a determined time.

When the discharge of ice is completed, the controller 270 controls the lamp 230c of the second discharge information area 234b to be turned off.

When it is determined that an amount of ice of the storage unit of the ice-making device is a predetermined amount or less, the controller 270 controls the purified water stored in the tank 262 to be supplied to the ice-maker of the ice-making device by controlling the fifth adjuster 266 to be opened.

The storage 271 stores the first reference amount of purified water for producing carbonated water, the second reference amount for discharging the purified water, the predetermined water level for determining the water overflow of the container, a first time from a time point at which the carbonated water producing command is received to a time point before the supply of the water is started, the second time from a time point at which the supply of the water is completed to a time point before the jet of the carbon dioxide is started, and the third time from a time point at which the jet of the carbon dioxide is completed to a time point before the pressure of the container is adjusted.

Here, the first time is a time that the second valve, which is the second adjuster 255, is opened in advance in order to prevent the pressure in the container 2 from increasing before the water is supplied thereto, and the third time is a time from a time point at which the jet of the carbon dioxide is completed to a time point before the second valve which is the second adjuster 255 is opened in order to reduce the pressure in the container 2.

The storage 271 stores jet information of carbon dioxide corresponding to the concentration of carbon dioxide and jet information of carbon dioxide corresponding to the carbonic acid addition command. Here, the jet information includes a jet condition for carbon dioxide jetting.

That is, the storage 271 stores the number of times to jet carbon dioxide corresponding to the concentration of carbonated water, and the number of times to jet carbon dioxide corresponding to the carbon dioxide addition command.

Here, the controller 270 may be a processor, a central processing unit (CPU), a micro controller unit (MCU), and the like, and the storage 271 may be a memory such as a random access memory (RAM) which may read and write data, a read only memory (ROM) which may read data, and the like.

Meanwhile, the refrigerator according to the disclosed embodiment includes the sound obtainer 248 provided to obtain a sound generated when carbon dioxide is supplied from the cylinder 251 to the container 2 through the nozzle 243 as described above. Since a sound generated in the cylinder 251 when carbon dioxide is jetted in a case in which there is sufficient carbon dioxide in the cylinder 251 is different from a sound generated when the carbon dioxide is jetted in the cylinder 251 in a case in which there is insufficient carbon dioxide in the cylinder 251, the refrigerator according to the disclosed embodiment determines a replacement time of the cylinder 251 using a difference between the sounds. When it is determined that it is the replacement time of the cylinder 251, the controller 270 notifies the user of the replacement time of the cylinder 251 by turning on the lamp 230c provided in the cylinder replacement display 236b of the user interface unit 230. Hereinafter, a method of determining the replacement time of the cylinder 251 using the sound obtainer 248 and notifying the user of the replacement time of the cylinder 251 through the user interface unit 230 will be described in detail.

Figure 11:
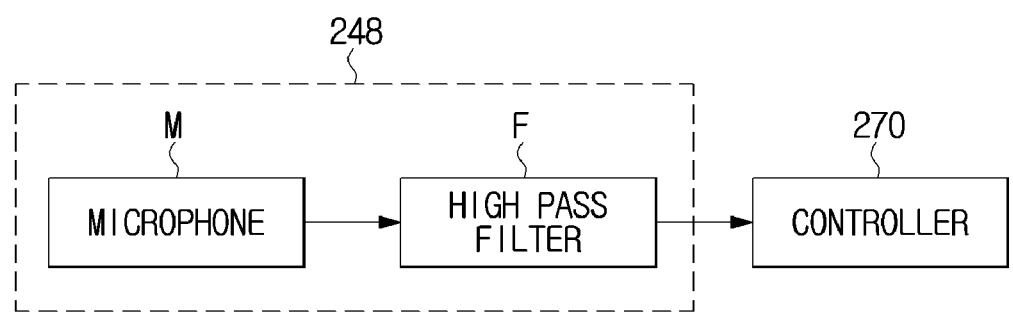
FIG. 11 is a block diagram illustrating a configuration of the sound obtainer of the refrigerator according to one embodiment.
Figure 12:
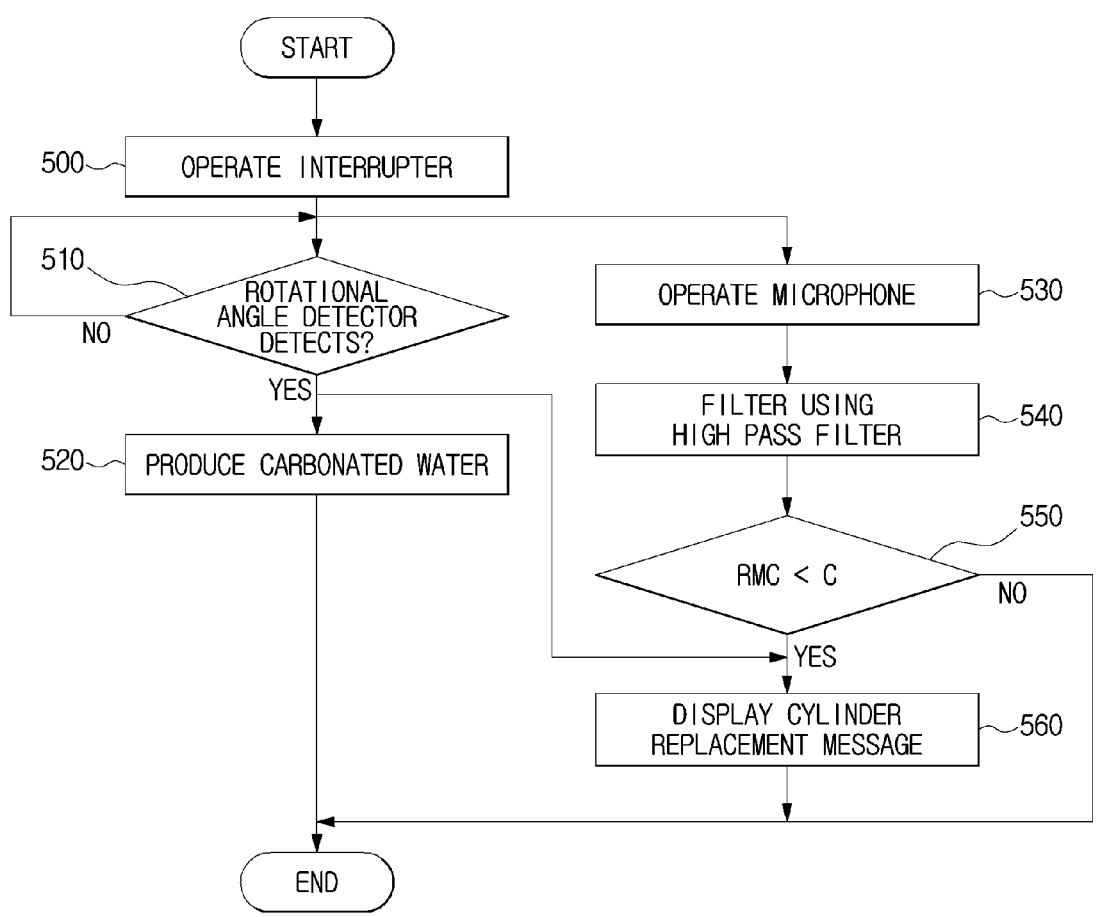
FIG. 12 is a flowchart illustrating a method of controlling the refrigerator according to one embodiment.

FIG. 11 is a block diagram illustrating a configuration of the sound obtainer 248 of the refrigerator 1 according to one embodiment, and FIG. 12 is a flowchart illustrating a method of controlling the refrigerator 1 according to one embodiment.

As illustrated in FIG. 11, the sound obtainer 248 according to one embodiment includes a single microphone M provided to obtain a sound generated in the cylinder 251, and a high pass filter F which filters a sound signal obtained by the microphone M.

The controller 270 turns on the microphone M at a time point at which carbon dioxide is supplied so that the microphone M obtains a sound generated when carbon dioxide of the cylinder 251 is supplied through the nozzle 243. The microphone M obtains peripheral noise as well as the sound generated by the supply of the carbon dioxide. The microphone M may obtain a variety of noises such as noises generated from home appliances such as a vacuum cleaner, a washing machine, a hair dryer, and the like, an external noise such as a car sound, and noise generated from a kitchen when washing dishes and cooking. Therefore, the refrigerator according to the disclosed embodiment excludes the peripheral noise as much as possible, does not operate the microphone M at normal times so that the sound generated when the carbon dioxide is supplied from the cylinder 251 is mainly obtained, and temporally filters the peripheral noise by turning the microphone M on at the time point at which the carbon dioxide is supplied from the cylinder 251.

For example, the controller 270 may turn the microphone M on in conjunction with a carbonated water production command when the carbonated water production command is input through the user interface unit 230. Alternatively, the controller 270 may turn on the microphone M at a time point at which the interrupter 252 operates so that the microphone M operates at a time closer to a time at which the carbon dioxide is jetted. Since the interrupter 252 interrupts flow of the carbon dioxide which moves from the cylinder 251 to the nozzle 243, the operating of the microphone M in conjunction with an operation time point of the interrupter 252 may be further matched to the purpose of temporally filtering peripheral noise.

The controller 270 turns the microphone M on in conjunction with the operation time point of the interrupter 252 as described above and turns the microphone M off when a time of about 1 second has elapsed. The above-described 1 second is only an example, and a time during which the microphone M operates may be preset and stored as a time appropriate to temporally filter the peripheral noise.

Even when the microphone M is driven in conjunction with the operation time point of the interrupter 252, noise generated at such a time point may be obtained by the microphone M. The sound obtainer 248 according to the disclosed embodiment includes the filter F in order to remove noise indicative of the peripheral noise from the sound signal obtained by the microphone M and to separate the sound generated when the carbon dioxide is jetted through the nozzle 243. The filter F may include a 34th finite impulse response (FIR) filter having about 2 kHz of cutoff frequency. Alternatively, the filter F may include a band pass filter through which a frequency of a band ranging from about 2 kHz to 4 kHz passes. Since noise, which is emphasized in a band of about 2 kHz or more or in the band ranging from about 2 kHz to 4 kHz in everyday life, is uncommon while the sound generated when the carbon dioxide is jetted through the nozzle 243 is emphasized in the band ranging from about 2 kHz to 4 kHz, the above-described filter F is used.

The controller 270 calculates a root mean square (RMS) value of the signal passing through the filter F, and determines whether there is insufficient carbon dioxide based on the calculated RMS value. The following Table 1 shows RMS values corresponding to types of sound.

TABLE 1

| | Type of sound | | | | | |
|---|---|---|---|---|---|---|
| | $CO_2$ normal | $CO_2$ insufficient | Washing machine operation | Vacuum cleaner operation | Wind Sound | Car sound |
| RMS [dB] | 38.6 | 11.7 | 12.6 | 23.5 | 12.8 | 20.4 |

Since an RMS value calculated when an amount of $CO_2$ is normal is greater than RMS values calculated when an amount of $CO_2$ is insufficient and peripheral noise is about 12 dB or more, it may be determined that there is insufficient carbon dioxide by detecting the sound generated when the carbon dioxide is jetted from the cylinder 251 through the nozzle 243. That is, the controller 270 may compare an RMS value of a signal passing through the filter F with a predetermined reference value c. When the calculated RMS value is less than the reference value, the controller 270 may determine that there is insufficient carbon dioxide in the cylinder 251. The reference value c may be pre-stored by setting an RMS value when the amount of $CO_2$ is normal as a predetermined margin and considering an RMS value when the amount of $CO_2$ is insufficient based on the RMS value when the amount of $CO_2$ is normal. When it is determined that there is insufficient carbon dioxide by comparing the RMS value with the reference value, the controller 270 turns the lamp 230c provided in the cylinder replacement display 236b of the user interface unit on to notify the user of the replacement time of the cylinder 251.

As such, the refrigerator according to the disclosed embodiment temporally filters peripheral noise through the control of a turn-on time point of the microphone M as described above, filters noise again through the filter F, and thus the sound generated when the carbon dioxide is jetted from the cylinder 251 through the nozzle 243 may be accurately obtained.

A method of notifying the user of the replacement time of the cylinder 251 will be described in more detail with reference to FIG. 12.

As illustrated in FIG. 12, when the interrupter 252 operates (S500), the rotational angle detector 253 detects a rotational angle of the interrupter 252 (S510), and when the rotational angle detector 253 detects an operation of the interrupter 252, carbonated water is produced (S520). Since a process of producing carbonated water has already been described, a description thereof will be omitted.

When the interrupter 252 operates, the controller 270 operates the microphone M (S530), and the high pass filter F filters sound obtained by the microphone M when the sound is detected by the microphone M (S540). The controller 270 calculates an RMS value of a signal passing through the filter F and compares the RMS value with a predetermined reference value (S550), and displays a replacement message of the cylinder 251 on a user interface unit when the RMS value is less than the reference value and the operation of the interrupter 252 is detected by the rotational angle detector 253 (S560).

The controller 270 turns on the microphone M at a time point at which carbon dioxide is supplied so that a sound generated when carbon dioxide of the cylinder 251 is supplied through the nozzle 243 is obtained by the microphone M. The microphone M obtains peripheral noise as well as the sound generated by the supply of the carbon dioxide. Therefore, the refrigerator according to the disclosed embodiment excludes the peripheral noise as much as possible, does not operate the microphone M at normal times so that the sound generated when the carbon dioxide is supplied from the cylinder 251 is mainly obtained, and temporally filters the peripheral noise by turning the microphone M on at the time point at which carbon dioxide is supplied from the cylinder 251.

For example, the controller 270 may turn the microphone M on at a time point at which the interrupter 252 operates so that the microphone M operates at a time closer to a time at which carbon dioxide is jetted. Since the interrupter 252 interrupts a flow of carbon dioxide which moves from the cylinder 251 to the nozzle 243, the microphone M being operated in conjunction with an operation time point of the interrupter 252 may be further matched to a purpose of temporally filtering the peripheral noise.

The controller 270 turns the microphone M on in conjunction with the operation time point of the interrupter 252 as described above and turns the microphone M off when a time of about 1 second has elapsed. The above-described 1 second is only an example, and the time during which the microphone M operates may be preset and stored as a time appropriate to temporally filter the peripheral noise.

Even when the microphone M is driven in conjunction with the operation time point of the interrupter 252, noise generated at such a time point may be obtained by the microphone M. The sound obtainer 248 according to the disclosed embodiment includes the filter F in order to remove noise indicative of the peripheral noise from a sound signal obtained by the microphone M and to separate the sound generated when carbon dioxide is jetted through the nozzle 243. The filter F may include a $34^{th}$ FIR filter having about 2 kHz of cutoff frequency. Alternatively, the filter F may include a band pass filter through which a frequency of a band ranging from about 2 kHz to 4 kHz passes. Since noise, which is emphasized in a band of about 2 kHz or more or in the band ranging from about 2 kHz to 4 kHz in everyday life, is uncommon while the sound generated when the carbon dioxide is jetted through the nozzle 243 is emphasized in the band ranging from about 2 kHz to 4 kHz, the above-described filter F is used.

The controller 270 calculates an RMS value of the signal passing through the filter F, and determines whether there is insufficient carbon dioxide based on the calculated RMS value. That is, the controller 270 may compare the RMS value of the signal passing through the filter F with the predetermined reference value c, and may determine that there is insufficient carbon dioxide in the cylinder 251 when the calculated RMS value is less than the reference value. When it is determined that there is insufficient carbon dioxide by comparing the RMS value with the reference value, the controller 270 turns the lamp 230c provided in the cylinder replacement display 236b of the user interface unit on to notify the user of the replacement time of the cylinder 251.

Figure 13:
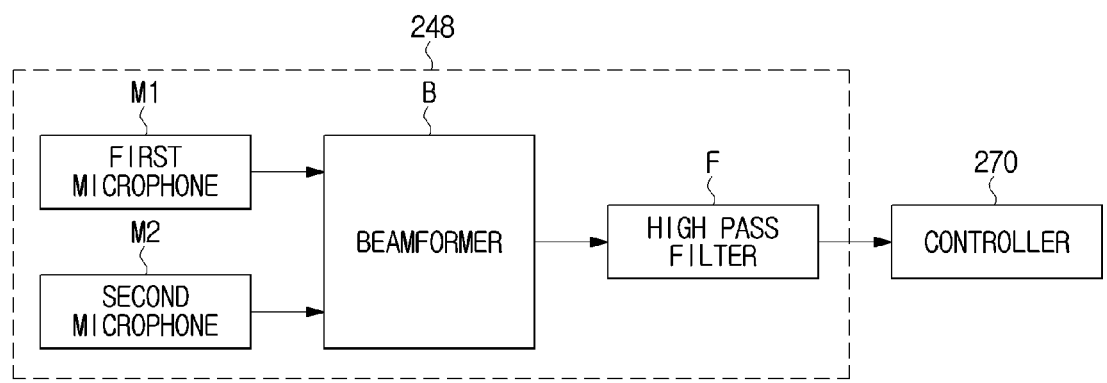
FIG. 13 is a block diagram illustrating a configuration of a sound obtainer of a refrigerator according to another embodiment.
Figure 14:
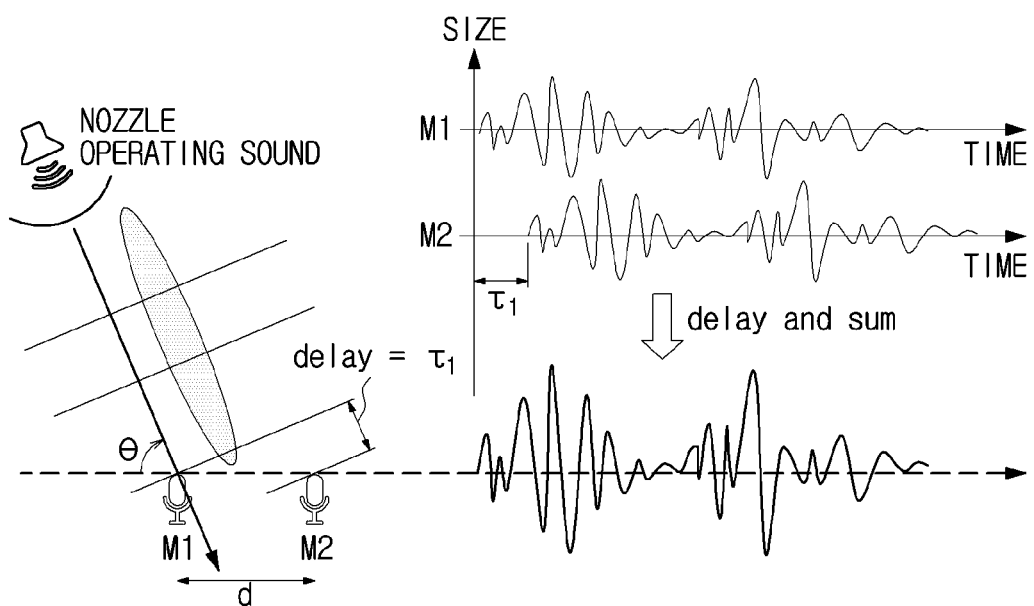
FIG. 14 is a view conceptually illustrating beamforming of a sound signal obtained by the sound obtainer of the refrigerator according to another embodiment.
Figure 15:
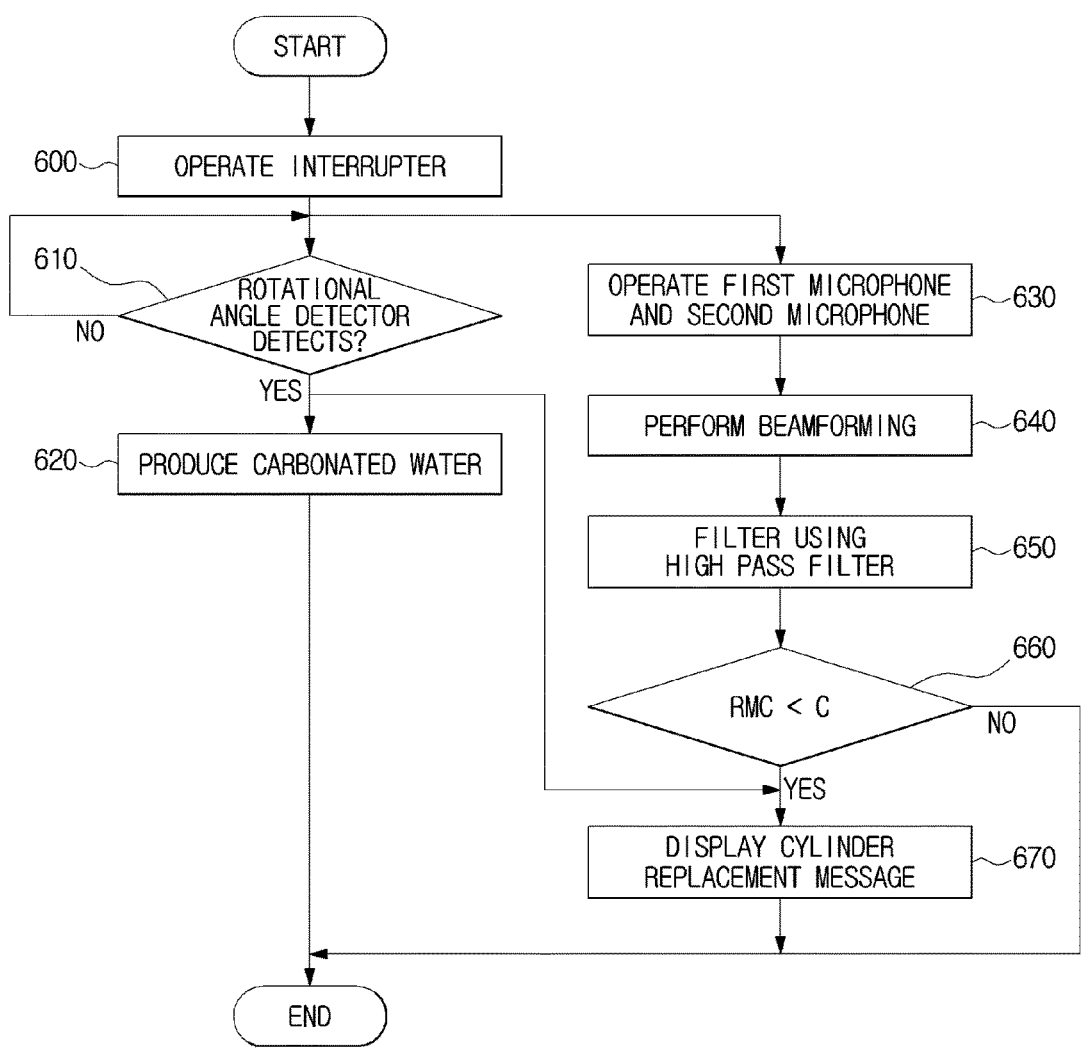
FIG. 15 is a flowchart illustrating a method of controlling the refrigerator according to another embodiment.

FIG. 13 is a block diagram illustrating a configuration of a sound obtainer 248 of a refrigerator according to another embodiment, and FIG. 14 is a view conceptually illustrating beamforming of a sound signal obtained by the sound obtainer 248 of the refrigerator according to another embodiment. FIG. 15 is a flowchart illustrating a method of controlling the refrigerator according to another embodiment.

As illustrated in FIG. 13, the sound obtainer 248 according to another embodiment includes a first microphone M1 and a second microphone M2 which are provided to obtain sound generated in a cylinder 251, a beamformer B which performs beamforming on the sound obtained by the first microphone M1 and the second microphone M2, and a high pass filter F which filters a signal beamformed by the beamformer B.

A controller 270 turns the microphones M1 and M2 on at a time point at which carbon dioxide is supplied so that a sound generated when carbon dioxide of the cylinder 251 is supplied through a nozzle 243 is obtained by the microphones M1 and M2. The microphones M1 and M2 obtain peripheral noise as well as the sound generated by the supply of the carbon dioxide. Therefore, the refrigerator according to the disclosed embodiment excludes the peripheral noise as much as possible, does not operate the microphone M1 and M2 at normal times so that the sound generated when the carbon dioxide is supplied from the cylinder 251 is mainly obtained, and temporally filters the peripheral noise by turning the microphone M1 and M2 on at the time point at which carbon dioxide is supplied from the cylinder 251. Since a description thereof is the same as the above-described description, the description thereof will be omitted.

The sound obtainer 248 according to the present embodiment may include the first microphone M1 and the second microphone M2, that is, two microphones, and may amplify the sound generated when carbon dioxide is jetted from the cylinder 251 through the nozzle 243. As illustrated in FIG. 14, a sound which is generated while the nozzle 243 operates is obtained by each of the first microphone M1 and the second microphone M2 which are spaced a predetermined distance apart. In this case, a difference between a time at which a sound generated in the nozzle 243 reaches the first microphone M1 and a time at which the sound generated in the nozzle 243 reaches the second microphone M2 occurs, and the difference is indicative of a phase difference between signals obtained by the first microphone M1 and the second microphone M2 as illustrated in FIG. 14.

A phase difference T1 which occurs in this case may be represented as a function of an arrangement distance d between the first microphone M1 and the second microphone M2 and a forward angle θ of the sound. The following Equation 1 shows the above-described phase difference τ1.

$$\tau 1 = d \cdot \cos\theta \cdot f_s / c \qquad <\text{Equation 1}>$$

In Equation 1, $f_s$ represents a sampling rate of the beamformer B, and c represents the speed of sound.

The beamformer B performs beamforming in which a phase difference between a sound signal obtained by the first microphone M1 and a sound signal obtained by the second microphone M2 is calculated by applying the arrangement distance between the first microphone M1 and the second microphone M2 and the forward angle of the sound to Equation 1, the calculated phase difference illustrated in FIG. 14 is used to delay the sound signal obtained by the second microphone M2 by the calculated phase difference, and then the delayed sound signal is summed with the sound signal obtained by the first microphone M1.

The beamformer B may amplify the sound generated in the nozzle 243 by removing the phase difference between the signals obtained by the two microphones and summing. Since such beamforming may minimize noise generated in spaces other than a space in which the sound is generated, the beamforming may provide an effect of spatial filtering peripheral noise. Since a sound signal which will be finally filtered in the disclosed embodiment is a signal having a high frequency ranging from about 2 kHz to 4 kHz, a distance between the two microphones for optimal beamforming may be set to range from about 50 mm to 85 mm.

Meanwhile, the sound obtainer 248 includes the filter F in order to remove noise indicative of the peripheral noise from the signal beamformed by the beamformer B and to separate the sound generated when carbon dioxide is jetted through the nozzle 243. The filter F may include a $34^{th}$ FIR filter having about 2 kHz of cutoff frequency. Alternatively, the filter F may include a band pass filter which passes a frequency of a band ranging from about 2 kHz to 4 kHz. Since noise, which is emphasized in a band of about 2 kHz or more or in the band ranging from about 2 kHz to 4 kHz in everyday life, is not uncommon while the sound generated when the carbon dioxide is jetted through the nozzle 243 is emphasized in a band ranging from about 2 kHz to 4 kHz, the above-described filter F is used.

The controller 270 calculates an RMS value of the signal passing through the filter F, and determines whether there is insufficient carbon dioxide based on the calculated RMS value. Since a description thereof is the same as the above-described description, the description thereof will be omitted.

When it is determined that there is insufficient carbon dioxide by comparing the RMS value with the reference value, the controller 270 turns the lamp 230c provided in the cylinder replacement display 236b of the user interface unit on to notify the user of the replacement time of the cylinder 251.

As such, the refrigerator according to the present embodiment temporally filters the peripheral noise through a control of turn-on time points of the microphones as described above, spatially filters the peripheral noise by beamforming the signals obtained by the two microphones, filters the noise again through the filter F, and thus the sound generated when the carbon dioxide is jetted from the cylinder 251 through the nozzle 243 may be accurately obtained.

A method of notifying the user of the replacement time of the cylinder 251 according to the present embodiment will be described with reference to FIG. 15.

As illustrated in FIG. 15, when the interrupter 252 operates (S600), the rotational angle detector 253 detects a rotational angle of the interrupter 252 (S610), and carbonated water is produced when an operation of the interrupter 252 is detected by the rotational angle detector 253 (S620). Since the process of producing carbonated water has already been described, a description thereof will be omitted.

When the interrupter 252 operates, the controller 270 operates the first microphone M1 and the second microphone M2 (S630), and the beamformer B performs beamforming when a sound is detected by the first microphone M1 and the second microphone M2 (S640). The high pass filter F filters a beamformed signal (S650), and the controller 270 calculates an RMS value of the signal passing through the filter F and compares the calculated RMS value with a predetermined reference value (S660). When it is determined that the RMS value is less than the reference value and the operation of the interrupter 252 is detected by the rotational angle detector 253, the controller 270 displays a replacement message of the cylinder 251 on a user interface unit (S670).

The controller 270 turns on the microphone at a time point at which carbon dioxide is supplied so that the sound generated when the carbon dioxide of the cylinder 251 is supplied through the nozzle 243 is obtained by the microphones. The microphones obtain peripheral noise as well as the sound generated by the supply of the carbon dioxide. Therefore, the refrigerator according to the disclosed embodiment excludes the peripheral noise as much as possible, does not operate the microphones at normal times so that the sound generated when the carbon dioxide is supplied from the cylinder 251 is mainly obtained, and temporally filters the peripheral noise by turning the microphones on at the time point at which carbon dioxide is supplied from the cylinder 251. Since a description thereof is the same as the above-described description, the description thereof will be omitted.

The sound obtainer 248 according to the present embodiment may include the first microphone M1 and the second microphone M2, that is, two microphones, and may amplify the sound generated when carbon dioxide is jetted from the cylinder 251 through the nozzle 243. As illustrated in FIG. 14, a sound which is generated while the nozzle 243 operates is obtained by the first microphone M1 and the second microphone M2 which are spaced a predetermined distance apart. In this case, a difference between a time at which the sound generated in the nozzle 243 reaches the first microphone M1 and a time at which the sound generated in the nozzle 243 reaches the second microphone M2 occurs, and the difference is indicative of a phase difference between signals obtained by the first microphone M1 and the second microphone M2 as illustrated in FIG. 14.

The phase difference T1 which occurs in this case may be represented as a function of the arrangement distance d between the first microphone M1 and the second microphone M2 and the forward angle θ of the sound. The above-described Equation 1 shows the above-described phase difference τ1.

The beamformer B performs beamforming in which a phase difference between a sound signal obtained by the first microphone M1 and a sound signal obtained by the second microphone M2 is calculated by applying the arrangement distance between the first microphone M1 and the second microphone M2 and the forward angle of the sound to Equation 1, the calculated phase difference illustrated in FIG. 14 is used to delay the sound signal obtained by the second microphone M2 by the calculated phase difference, and then the delayed sound signal is summed with the sound signal obtained by the first microphone M1.

The beamformer B may amplify the sound generated in the nozzle 243 by removing phase difference and summing the signals obtained by the two microphones. Since such beamforming may minimize noise generated in spaces other than a space in which the sound is generated, the beamforming may provide an effect of spatial filtering the peripheral noise. Since a sound signal which will be finally filtered in the disclosed embodiment is a signal having a high frequency ranging from about 2 kHz to 4 kHz, a distance between the two microphones for optimal beamforming may be set to range from about 50 mm to 85 mm.

Meanwhile, the sound obtainer 248 includes the filter F in order to remove the noise indicative of the peripheral noise from the signal beamformed by the beamformer B and to separate the sound generated when carbon dioxide is jetted through the nozzle 243. The filter F may include a $34^{th}$ FIR filter having about 2 kHz of cutoff frequency. Alternatively, the filter F may include a band pass filter which passes a frequency of a band ranging from about 2 kHz to 4 kHz. Since noise, which is emphasized in a band of about 2 kHz or more or in the band ranging from about 2 kHz to 4 kHz in everyday life, is not uncommon while the sound generated when carbon dioxide is jetted through the nozzle 243 is emphasized in the band ranging from about 2 kHz to 4 kHz, the above-described filter F is used.

The controller 270 calculates an RMS value of the signal passing through the filter F, and determines whether there is insufficient carbon dioxide based on the calculated RMS value. Since a description thereof is the same as the above-described description, the description thereof will be omitted.

When it is determined that there is insufficient carbon dioxide by comparing the RMS value with the reference value, the controller 270 turns the lamp 230c provided in the cylinder replacement display 236b of the user interface unit on to notify the user of the replacement time of the cylinder 251.

The carbonated water producing apparatus and the refrigerator having the same according to one embodiment notify the user of the replacement time of the cylinder exactly.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A carbonated water producing apparatus comprising:
   a carbonated water producing unit including a cylinder configured to store carbon dioxide and configured to supply the carbon dioxide to a container;
   a microphone configured to obtain sound generated in the carbonated water producing unit;
   a user interface unit configured to display information related to carbonated water production; and
   a controller configured to obtain the sound generated when carbon dioxide is supplied from the cylinder to the container by driving the microphone when the carbonated water producing unit operates, and configured to display a message which requests that the cylinder that stores the carbon dioxide be replaced on the user interface unit when an intensity of a signal passing through a filter is less than a predetermined reference value;
   wherein the carbonated water producing unit includes an interrupter configured to interrupt a supply of the carbon dioxide, and
   wherein the controller operates the microphone when the interrupter operates.

2. The apparatus according to claim 1, wherein the controller displays the message which requests that the cylinder which stores the carbon dioxide be replaced on the user interface unit when the intensity of the signal passing through the filter is less than the predetermined reference value and the carbon dioxide is supplied from the carbonated water producing unit to the container.

3. The apparatus according to claim 1, wherein:
   the carbonated water producing unit includes the interrupter configured to interrupt a supply of the carbon dioxide and a hall sensor configured to detect an operating state of the interrupter; and
   the controller displays the message which request that the cylinder which stores the carbon dioxide be replaced on the user interface unit when the intensity of the signal passing through the filter is less than the predetermined reference value and an operation of the interrupter is detected by the hall sensor.

4. The apparatus according to claim 1, wherein the controller operates the microphone when a carbonated water production command is input through the user interface unit.

5. The apparatus according to claim 1, wherein the controller calculates a root mean square (RMS) value of the signal passing through the filter, and displays the message which requests that the cylinder which stores the carbon dioxide be replaced on the user interface unit when the calculated RMS value is less than the predetermined reference value.

6. The apparatus according to claim 1, wherein:
   the microphone includes a first microphone and a second microphone which are spaced a predetermined distance apart; and
   the apparatus further comprises a beamformer configured to remove a phase difference between sound signals obtained by the first microphone and the second microphone and then to sum the sound signals.

7. The apparatus according to claim 6, wherein the filter passes a signal having a frequency of a predetermined cutoff frequency or more of the sound signals summed by the beamformer.

8. A refrigerator comprising:
   a carbonated water producing unit including a cylinder configured to store carbon dioxide and configured to supply the carbon dioxide to a container;
   a dispenser provided in a door and including a discharge port configured to discharge carbon dioxide supplied from the carbonated water producing unit and having the container detachably provided therein;
   a microphone configured to obtain sound generated in the carbonated water producing unit;
   a user interface unit configured to display information related to carbonated water production; and
   a controller configured to obtain the sound generated when carbon dioxide is supplied from the cylinder to the container by driving the microphone when the carbonated water producing unit operates, and configured to display a message which requests that the cylinder which stores the carbon dioxide be replaced on the user interface unit when an intensity of a signal passing through a filter is less than a predetermined reference value;
   wherein the carbonated water producing unit includes an interrupter configured to interrupt a supply of the carbon dioxide, and
   wherein the controller operates the microphone when the interrupter operates.

9. The refrigerator according to claim 8, wherein the controller displays the message which requests that the cylinder which stores the carbon dioxide be replaced on the user interface unit when the intensity of the signal passing through the filter is less than the predetermined reference value and the carbon dioxide is supplied from the carbonated water producing unit to the container.

10. The refrigerator according to claim 8, wherein:
    the microphone includes a first microphone and a second microphone which are spaced a predetermined distance apart; and
    the refrigerator further comprises a beamformer configured to remove a phase difference between sound signals obtained by the first microphone and the second microphone and then to sum the sound signals.

11. The refrigerator according to claim 10, wherein the filter passes a signal having a frequency of a predetermined cutoff frequency or more of the sound signals summed by the beamformer.

* * * * *